US012803329B2

(12) United States Patent
An et al.

(10) Patent No.: US 12,803,329 B2
(45) Date of Patent: Nov. 17, 2026

(54) ELECTRONIC DEVICE

(71) Applicant: Samsung Electronics Co., Ltd., Suwon-si (KR)

(72) Inventors: Yonghee An, Suwon-si (KR); Sangwon Kim, Suwon-si (KR); Jiyoung Kim, Suwon-si (KR); Taekeun Kim, Suwon-si (KR); Chankyu Lim, Suwon-si (KR); Jiwoo Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 741 days.

(21) Appl. No.: 18/105,532

(22) Filed: Feb. 3, 2023

(65) Prior Publication Data

US 2023/0187971 A1 Jun. 15, 2023

Related U.S. Application Data

(63) Continuation of application No. PCT/KR2021/010170, filed on Aug. 3, 2021.

(30) Foreign Application Priority Data

Aug. 4, 2020 (KR) ........................ 10-2020-0097667

(51) Int. Cl.
*H02J 50/90* (2016.01)
*G06F 3/0354* (2013.01)
(Continued)

(52) U.S. Cl.
CPC .......... *H02J 50/10* (2016.02); *G06F 3/03545* (2013.01); *G06F 3/038* (2013.01); *H02J 7/731* (2026.01)

(58) Field of Classification Search
CPC ............................... H02J 50/90; G06F 1/1607
(Continued)

(56) References Cited

U.S. PATENT DOCUMENTS 9,507,318 B2 11/2016 Maeshima et al.
9,507,381 B1 * 11/2016 Vanderet ............. G06F 3/03545
(Continued)

FOREIGN PATENT DOCUMENTS

CN 109542254 A 3/2019
KR 20140118099 A 10/2014
(Continued)

OTHER PUBLICATIONS

Korean Examination Report Issued In KR Application No. 10-2020-0097667; Mail Date Jun. 12, 2025; 21 Pages.
(Continued)

*Primary Examiner* — Ahmed H Omar
(74) *Attorney, Agent, or Firm* — CANTOR COLBURN LLP

(57) ABSTRACT

Various embodiments disclosed in the present document relate to an electronic device capable of wirelessly charging a pen input device. According to various embodiments disclosed in the present document, provided is an electronic device comprising: a housing that accommodates an electronic component in the inner space thereof; a wireless charging coil disposed on the inner surface of the housing forming the inner space; a first magnetic body group disposed on the inner surface of the housing and aligned with the wireless charging coil in a first direction; and a magnetic field sensor, disposed to be spaced apart from the first magnetic body group by a predetermined distance, for recognizing reverse attachment of a pen input device attachable to the electronic device. Various other embodiments may be provided.

16 Claims, 16 Drawing Sheets

(51) Int. Cl.
*G06F 3/038* (2013.01)
*H02J 7/70* (2026.01)
*H02J 50/10* (2016.01)

(58) Field of Classification Search
USPC .......................................................... 320/108
See application file for complete search history.

(56) References Cited

U.S. PATENT DOCUMENTS

| | | | | |
|---|---|---|---|---|
| 11,402,873 | B2 * | 8/2022 | Meng | G06F 1/1607 |
| 11,666,279 | B2 * | 6/2023 | Leabman | G01S 13/88 600/407 |
| 2014/0292730 | A1 | 10/2014 | Yoon et al. | |
| 2016/0094076 | A1 | 3/2016 | Kasar et al. | |
| 2017/0047765 | A1 | 2/2017 | Jung et al. | |
| 2017/0048370 | A1 | 2/2017 | Kim et al. | |
| 2017/0070001 | A1 | 3/2017 | Degner et al. | |
| 2017/0108952 | A1 | 4/2017 | Tang et al. | |
| 2018/0088690 | A1 | 3/2018 | Seo et al. | |
| 2018/0314349 | A1 | 11/2018 | Jiang et al. | |
| 2018/0329527 | A1 | 11/2018 | Park et al. | |
| 2019/0033917 | A1 | 1/2019 | Stryker | |
| 2019/0103764 | A1 | 4/2019 | Marshall et al. | |
| 2020/0012353 | A1 | 1/2020 | Kim et al. | |
| 2020/0089340 | A1 | 3/2020 | Ruscher et al. | |
| 2020/0201455 | A1 * | 6/2020 | Tanaka | G06F 3/0383 |
| 2021/0313844 | A1 | 10/2021 | Kim et al. | |

FOREIGN PATENT DOCUMENTS

| | | | |
|---|---|---|---|
| KR | 20150010386 | A | 1/2015 |
| KR | 20170019995 | A | 2/2017 |
| KR | 20170020144 | A | 2/2017 |
| KR | 20180012398 | A | 2/2018 |
| KR | 20180035606 | A | 4/2018 |
| KR | 20180124398 | A | 11/2018 |
| KR | 20190038437 | A | 4/2019 |
| KR | 20200005849 | A | 1/2020 |
| KR | 20200028729 | A | 3/2020 |
| KR | 102117767 | B1 | 6/2020 |
| WO | 2018194557 | A1 | 10/2018 |

OTHER PUBLICATIONS

International Search Report and Written Opinion for International Application No. PCT/KR2021/010170; International filing date Aug. 3, 2021; Date of Mailing Apr. 12, 2023; 9 Pages.

Korean Office Action Issued In KR Application No. 10-2020-0097667; Mail Date Oct. 8, 2024; 21 Pages.

International Search Report with Written Opinion for International Application No. PCT/KR2021/010170; Application Filing Date Aug. 3, 2021; Date of Mailing Nov. 10, 2021 (15 pages).

* cited by examiner

ELECTRONIC DEVICE

CROSS-REFERENCE TO RELATED APPLICATION(S)

This application is a continuation application, claiming priority under § 365(c), of International Application No. PCT/KR2021/010170, filed on Aug. 3, 2021, which is based on and claims the benefit of Korean patent application number 10-2020-0097667, filed on Aug. 4, 2020, in the Korean Intellectual Property Office, the disclosures of which are incorporated by reference herein in their entireties.

TECHNICAL FIELD

Various embodiments of the disclosure relate to an electronic device capable of wirelessly charging a pen input device.

BACKGROUND

In recent years, portable electronic devices such as smartphones, tablet personal computer (PC), or the like have been actively distributed, and technologies for pen input devices applicable to portable electronic devices have been actively developed. A smartphone or tablet PC mainly includes a touchscreen, and a user may designate specific coordinates on the touch screen using her finger or a pen input device. The user may input a specific signal to the smartphone by designating specific coordinates on the touchscreen.

In general, a tablet PC, which is a representative portable electronic device, is a personal computer that is not equipped with a keyboard or a mouse and is mainly operated by a touchscreen. Tablet PCs are less convenient for tasks than netbooks or laptops but have increasing demand for students or office workers with their excellent portability.

As more and more functions are converged on these tablets, users spend more time using such functions as DMB broadcasting, video playback, image viewing, and camera capture through tablets. There is also increasing use in other various fields, such as entry of characters through the virtual keyboard, drawings using a pen input device (e.g., stylus pen), or reading electronic books. Accordingly, a pen input device may be provided as an active input device that is capable of exchanging electrical signals with the touchscreen, rather than simply applying physical force. In this case, the pen input device may include a communication module, an antenna, and a battery. The battery may receive power through wireless charging from an external electronic device.

The battery in the pen input device may be charged by placing the wireless power receiving unit in the pen input device in a position adjacent to the wireless power transmitting unit (hereinafter, referred to as a 'wireless charging unit') of the electronic device.

According to the prior art, there is no means capable of recognizing the reverse attachment state or tilted attachment state in which the wireless power receiving unit of the pen input device does not overlap the wireless power transmitting unit of the electronic device when the pen input device (e.g., stylus pen) is placed on the wireless charging unit. When the pen input device is reversely attached or tiltedly attached, the pen input device may not switch to a sleep state, so that the battery may be discharged. This cause inconvenience to the user in that the user needs to recharge before using the pen input device.

According to various embodiments of the disclosure, there may be provided an electronic device capable of recognizing a reverse attachment state or tilted attachment state of a pen input device upon wirelessly charging the pen input device.

SUMMARY

According to various embodiments of the disclosure, there may be provided an electronic device, comprising a housing configured to accommodate an electronic component in an inner space, a wireless charging coil disposed on an inner surface of the housing forming the inner space, a first magnetic substance group disposed on the inner surface of the housing and aligned with the wireless charging coil in a first direction, and at least one magnetic field sensor disposed to be spaced apart from the first magnetic substance group by a predetermined distance and aligned with the wireless charging coil and the first magnetic substance group in the first direction, and configured to recognize reverse attachment or tilted attachment of a pen input device attachable to the electronic device.

According to various embodiments of the disclosure, there may be provided an electronic device, comprising a first plate; a second plate facing away from the first plate, a housing including a side member surrounding an inner space between the first plate and the second plate, a wireless charging coil disposed on an inner surface of the housing, a first magnetic substance group disposed on the inner surface of the housing and aligned with the wireless charging coil in a first direction, a magnetic field sensor spaced apart from the first magnetic substance group by a predetermined distance to recognize reverse attachment of a pen input device attachable to the electronic device, and a pen input device attachable to the second plate or the side member, wherein the pen input device includes a second magnetic substance group corresponding to the first magnetic substance group and a coil unit.

According to various embodiments of the disclosure, it is possible to determine the reverse attachment state or tilted attachment state of the pen input device and thereby allow the user to recognize it.

According to various embodiments of the disclosure, it is possible to prevent non-entry into the sleep state of the pen input device and discharge of the battery due to a misalignment when the pen input device is used.

DETAILED DESCRIPTION

Hereinafter, embodiments of the present disclosure are described with reference to the accompanying drawings.

Figure 1:
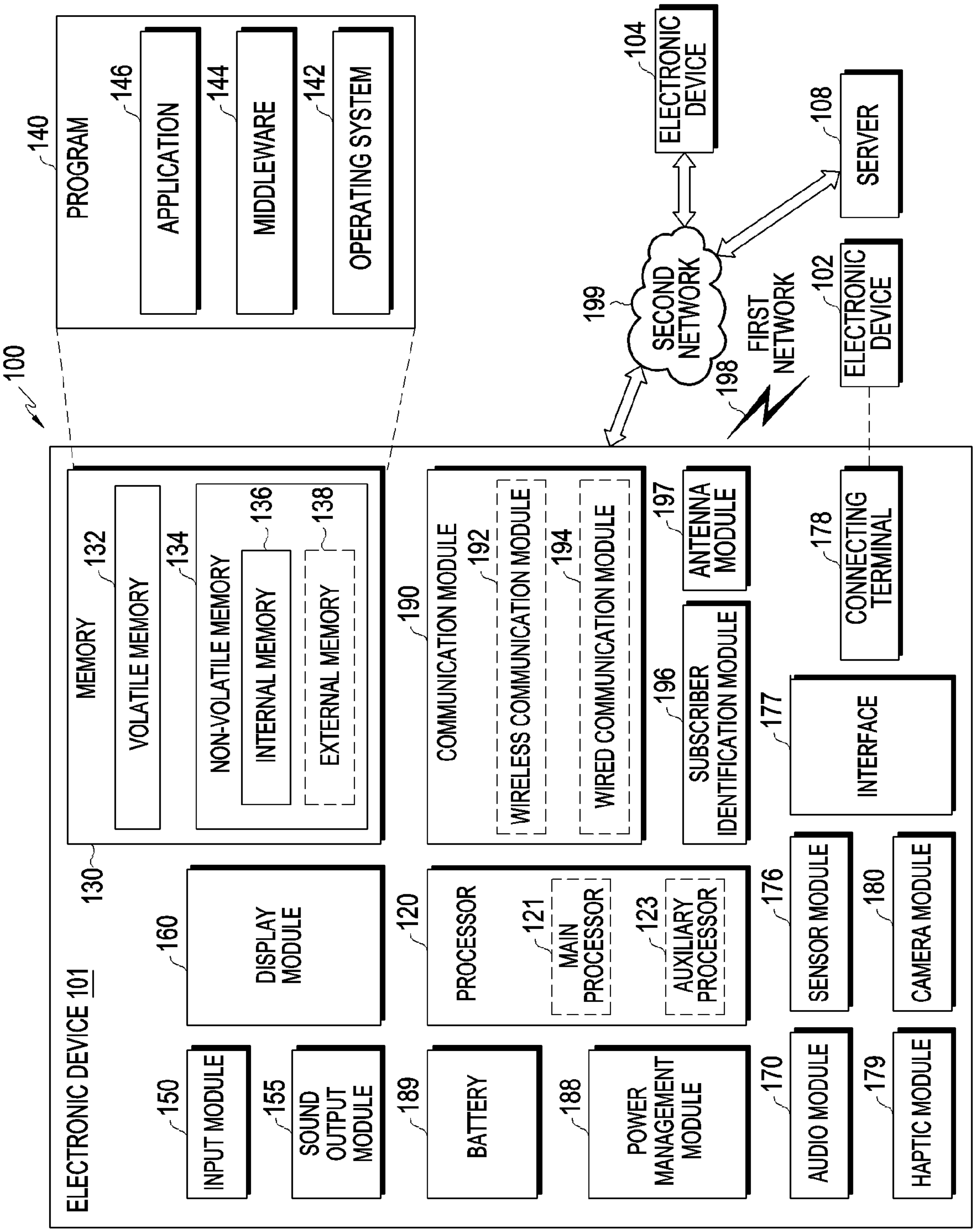
FIG. 1 is a view illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device and the external electronic device via the server coupled with the second network. The external electronic devices each may be a device of the same or a different type from the electronic device. According to an embodiment, all or some of operations to be executed at the electronic device may be executed at one or more of the external electronic devices. For example, if the electronic device should perform a function or a service automatically, or in response to a request from a user or another device, the electronic device, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device. The electronic device may provide the outcome, with or without further processing of the outcome, as at least part of a reply to the request. To that end, a cloud computing, distributed computing, mobile edge computing (MEC), or client-server computing technology may be used, for example. The electronic device may provide ultra low-latency services using, e.g., distributed computing or mobile edge computing. In another embodiment, the external electronic device may include an Internet-of-things (IoT) device. The server may be an intelligent server using machine learning and/or a neural network. According to an embodiment, the external electronic device or the server may be included in the second network. The electronic device may be applied to intelligent services (e.g., smart home, smart city, smart car, or healthcare) based on 5G communication technology or IoT-related technology.

Figure 2:
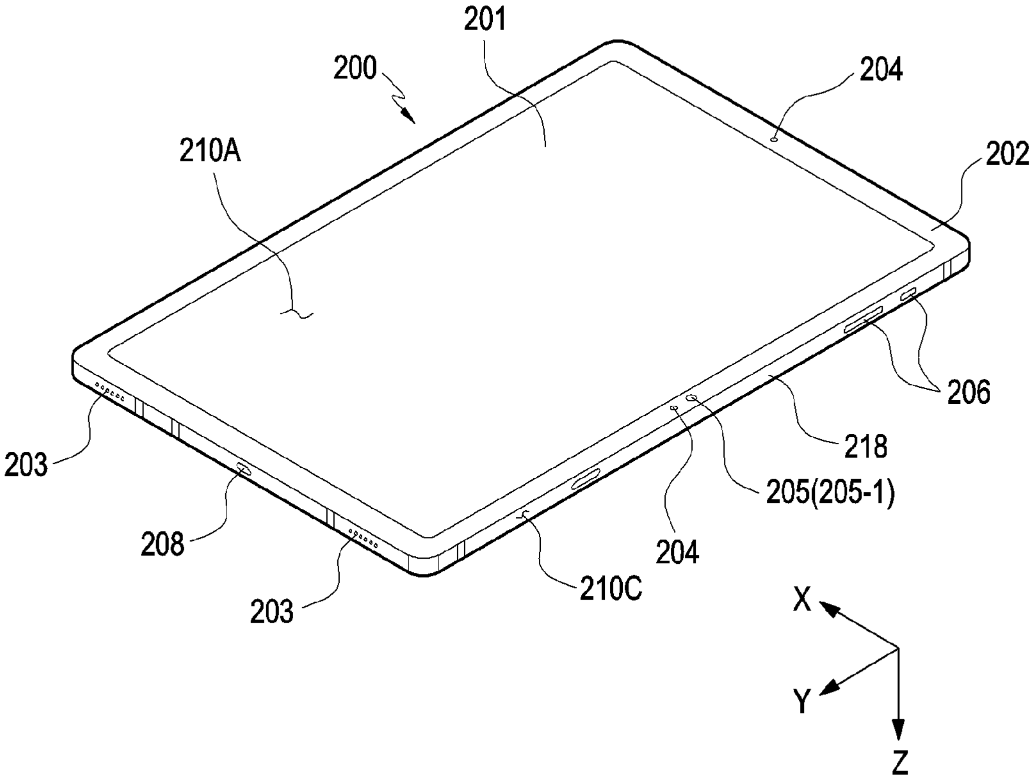
FIG. 2 is a front perspective view illustrating an electronic device according to various embodiments.
Figure 3:
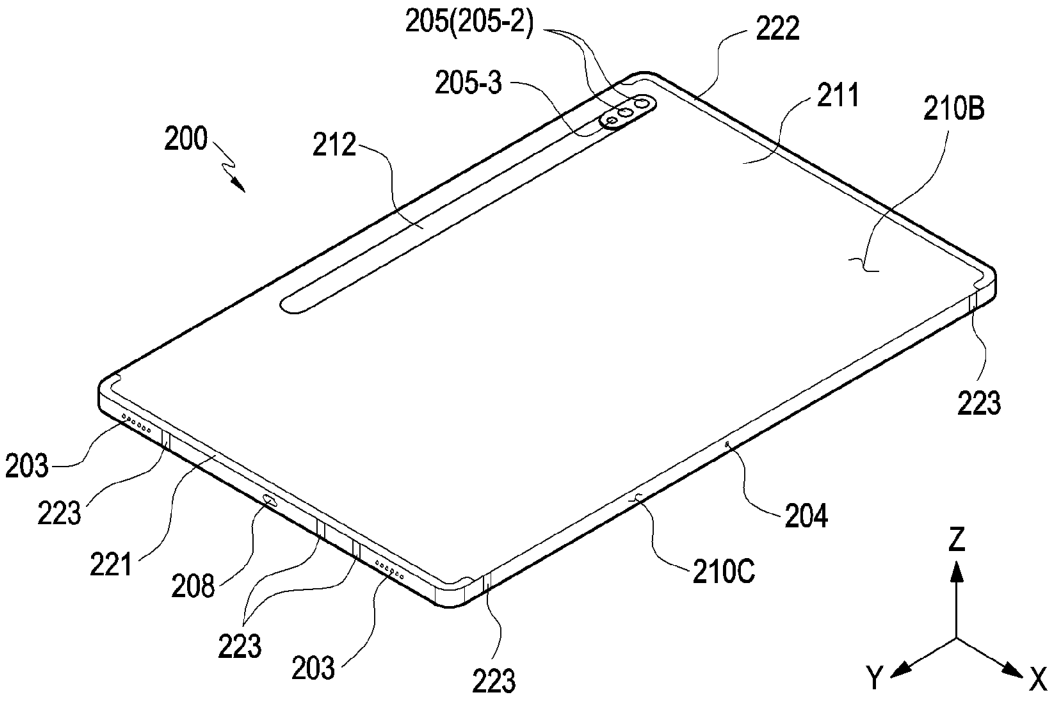
FIG. 3 is a rear perspective view illustrating the electronic device of FIG. 2.

FIG. 2 is a front perspective view illustrating an electronic device 200 according to various embodiments. FIG. 3 is a rear perspective view illustrating the electronic device 200 of FIG. 2.

FIGS. 2 and 3 and the subsequent figures illustrate a spatial coordinate system defined by an X-axis, a Y-axis and a Z-axis orthogonal to each other. Here, the X axis may indicate a width direction of the electronic device 200, the Y axis may indicate a length direction of the electronic device 200, and the Z axis may indicate a height direction of the electronic device 200.

Referring to FIGS. 2 and 3, according to an embodiment, an electronic device 200 may include a housing 210 including a first side (or front surface) 210A, a second side (or rear surface) 210B, and a side surface 210C surrounding the space between the first surface 210A and the second surfaces 210B. According to another embodiment (not shown), the housing may denote a structure forming part of the first surface 210A, the second surface 210B, and the side surface 210C of FIG. 2. According to an embodiment, at least part of the first surface 210A may be formed by a substantially transparent first plate 202 (e.g., a glass plate or polymer plate including various coat layers). The second surface 210B may be formed by a second plate 211 that is substantially opaque. The second plate 211 may be formed of at least one or a combination of two or more of, e.g., laminated or colored glass, ceramic, polymer, or metal (e.g., aluminum, stainless steel (STS), or magnesium). For example, the second plate 211 may be formed of a combination of metal and glass. Here, the glass may include a combination of a plurality of glasses having different colors, materials, and/or textures. The side surface 210C may be coupled with the first plate 202 and the second plate 211 and be formed by a side member 218 including a metal and/or polymer. According to an embodiment, the second plate 211 and the side member 218 may be integrally formed together and include the same material (e.g., a metal, such as aluminum).

According to an embodiment, the electronic device 200 may include at least one or more of a display 201, an audio module 203, a camera module 205, a key input device 206, and a connector hole 208. According to an embodiment, the electronic device 200 may exclude at least one (e.g., the key input device 206) of the components or may add other components.

The display 201 may be exposed through a significant portion of the first plate 202. According to an embodiment, the display 201 may have a rectangular outer edge. According to an embodiment, the edge of the display 201 may be formed to be substantially the same in shape as an adjacent outer edge of the first plate 202. According to an embodiment (not shown), the interval between the outer edge of the display 201 and the outer edge of the first plate 202 may remain substantially even to give a larger area of exposure the display 201.

The display 201 may include, e.g., a liquid crystal display (LCD), a light emitting diode (LED) display, an organic light emitting diode (OLED) display, or a microelectromechanical systems (MEMS) display, or an electronic paper display. The display 201 may display, e.g., various contents (e.g., text, images, videos, icons, or symbols) to the user.

According to an embodiment (not shown), the screen display area of the display 201 may have a recess or opening in a portion thereof, and at least one or more of the audio module 203, sensor module 204, and camera module 205 may be aligned with the recess or opening. According to another embodiment (not shown), the display 201 may be disposed to be coupled with, or adjacent to, a pressure sensor capable of measuring the strength (pressure) of a touch and/or a digitizer for recognizing the coordinates of a magnetic-type pen input. The display 201 may receive a touch, gesture, approach, or hovering input using, e.g., the pen input device (or stylus pen) or the user's body portion.

The audio module 203 may include a microphone hole and a speaker hole. A microphone for obtaining an external sound may be disposed inside the microphone hole. In an embodiment, the microphone hole may include a plurality of microphones disposed in different positions (or on different surfaces) of the electronic device to detect the direction of sound. The speaker holes may include an external speaker hole and/or a phone receiver hole. According to an embodiment, the speaker hole and the microphone hole may be implemented as a single hole, or a speaker may be included without the speaker hole (e.g., a piezo speaker).

The sensor module 204 may produce an electrical signal or data value corresponding to the internal operation state or external environment state of the electronic device 200. The sensor module 204 may be disposed on, e.g., the first surface 210A or the second surface 210B of the housing 210 and, additionally or alternatively, may also be disposed on the side surface 210C. The sensor module may further include at least one of a proximity sensor, an illuminance sensor, a biometric sensor, a gesture sensor, a gyro sensor, an atmospheric pressure sensor, a magnetic sensor, an acceleration sensor, a grip sensor, a color sensor, an infrared (IR) sensor, a temperature sensor, or a humidity sensor.

The camera module 205 may include a first camera device 205-1 disposed on the first surface 210A of the electronic device 200, a second camera device 205-2 disposed on the second surface 210B and/or a flash 205-3. The camera devices 205-1 and 250-2 may include one or more lenses, an image sensor, and/or an image signal processor. The flash 205-3 may include, e.g., a light emitting diode (LED) or a xenon lamp. According to an embodiment, two or more lenses (an infrared (IR) camera, a wide-angle lens, and a telephoto lens) and image sensors may be disposed on one surface of the electronic device 200.

The key input device 206 may be disposed on the side surface 210C of the housing 210. According to another embodiment, the electronic device 200 may exclude all or some of the above-mentioned key input devices 206 and the excluded key input devices 206 may be implemented in other forms, e.g., as soft keys, on the display 201.

The connector hole 208 may include a connector hole for receiving a connector (e.g., USB connector) for transmitting/receiving power and/or data with an external electronic device and/or a connector hole for receiving a connector (e.g., earphone jack) for transmitting/receiving audio signals with the external electronic device.

Figure 4:
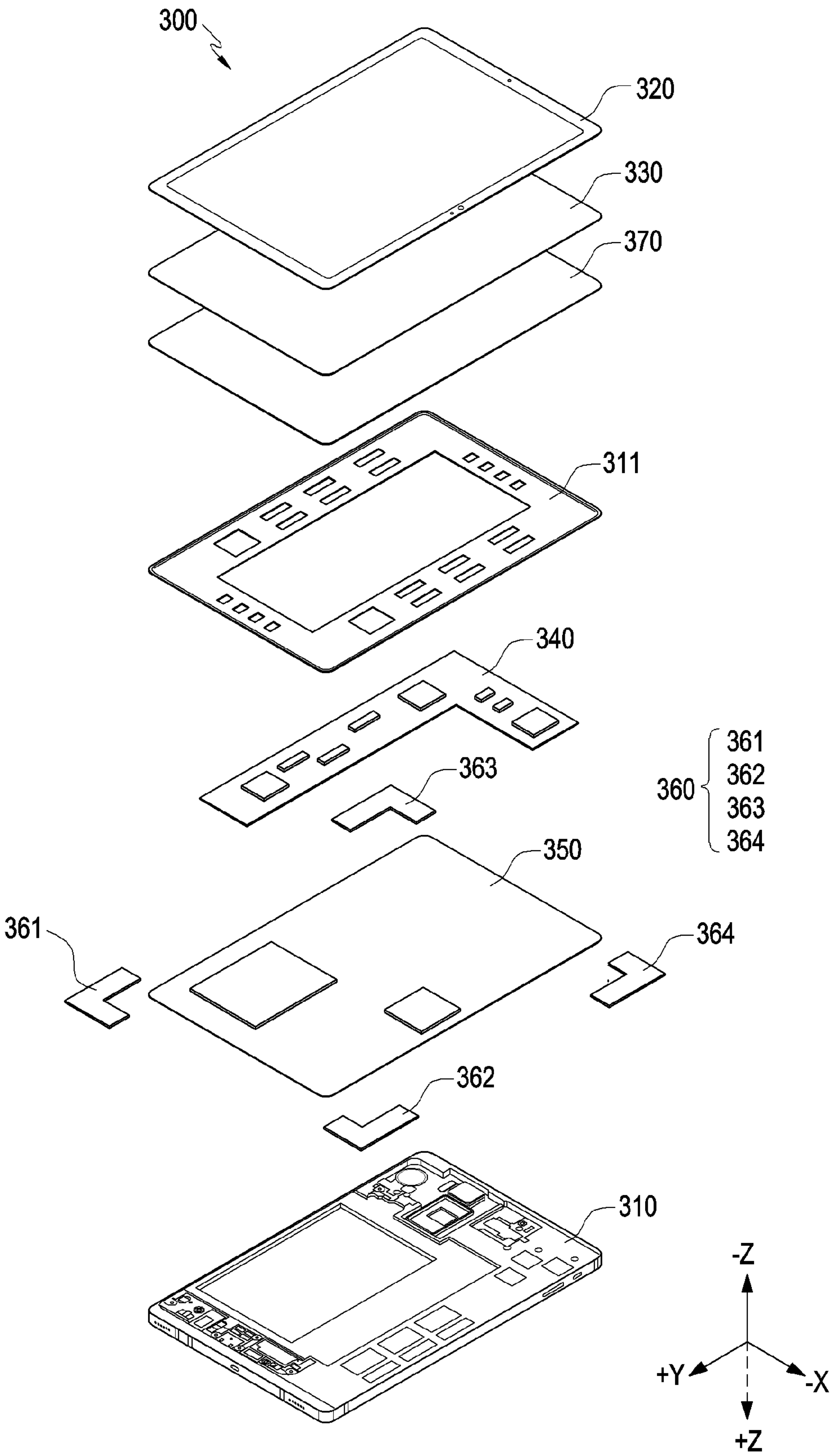
FIG. 4 is an disassembled perspective view illustrating an electronic device according to various embodiments.

FIG. 4 is an disassembled perspective view illustrating an electronic device according to various embodiments.

Referring to FIG. 4, an electronic device 300 may include a side bezel structure 310 (e.g., the side member 218 of FIG. 2), a first supporting member 311 (e.g., a bracket), a first plate 320, a display 330, an electromagnetic induction panel 370, a printed circuit board 340, and a battery 350. The second plate facing in the opposite direction to the first plate 320 may be integrally integrated with the side bezel structure 310. According to an embodiment, the electronic device 300 may exclude at least one (e.g., the first supporting member 311) of the components or may add other components. At least one of the components of the electronic device 300 may be the same or similar to at least one of the components of the electronic device 200 of FIG. 1 or 2 and no duplicate description is made below.

The electromagnetic induction panel 370 (e.g., a digitizer) may be a panel for detecting input by the pen input device. For example, the electromagnetic induction panel 370 may include a printed circuit board (PCB) (e.g., flexible printed circuit board (FPCB)) and a shielding sheet. The shielding sheet may prevent inter-component interference by an electromagnetic field produced from the components (e.g., the display module, PCB, or electromagnetic induction panel) included in the electronic device 300. The shielding sheet may shield off electromagnetic fields produced from the components, thereby allowing an input from the pen input device to be precisely delivered to the coil included in the electromagnetic induction panel 370.

The first supporting member 311 may be disposed inside the electronic device 300 to be connected with the side bezel structure 310 or integrated with the side bezel structure 310. The first supporting member 311 may be formed of, e.g., a metal and/or non-metallic material (e.g., polymer). The display 330 may be joined onto one surface of the first supporting member 311, and the printed circuit board 340 may be joined onto the opposite surface of the first supporting member 311. A processor, memory, and/or interface may be mounted on the printed circuit board 340. The processor may include one or more of, e.g., a central processing unit, an application processor, a graphic processing device, an image signal processing, a sensor hub processor, or a communication processor.

The memory may include a volatile or non-volatile memory.

The interface may include a high definition multimedia interface (HDMI), a universal serial bus (USB) interface, a secure digital (SD) card interface, and/or an audio interface. The interface may electrically or physically connect, e.g., the electronic device 300 with an external electronic device and may include a USB connector, an SD card/multimedia card (MMC) connector, or an audio connector.

The battery 350 may be a device for supplying power to at least one component of the electronic device 300. The battery 450 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrally or detachably disposed inside the electronic device 300.

According to various embodiments, the electronic device 300 may further include an antenna structure 360 that includes antennas 361, 362, 363, and 364. Referring to FIGS. 3 and 4 together, at least a portion of the housing of the electronic device 300 may be used as a radiator of the antennas 361, 362, 363, and 364. For example, at least a portion of the frame of the housing may be used as a radiator of an antenna (hereinafter, referred to as a 'frame antenna'). The frame antenna may be separated from other adjacent frame antenna portions through band-shaped antenna injection-molded members 221 and 222 and a plurality of slits 223. According to various embodiments, a 5G mmWave antenna may be received and used inside the housing of the electronic device 300. The antenna may be used to perform short-range communication with, e.g., an external device or may wirelessly transmit or receive power necessary for charging.

Figure 5:
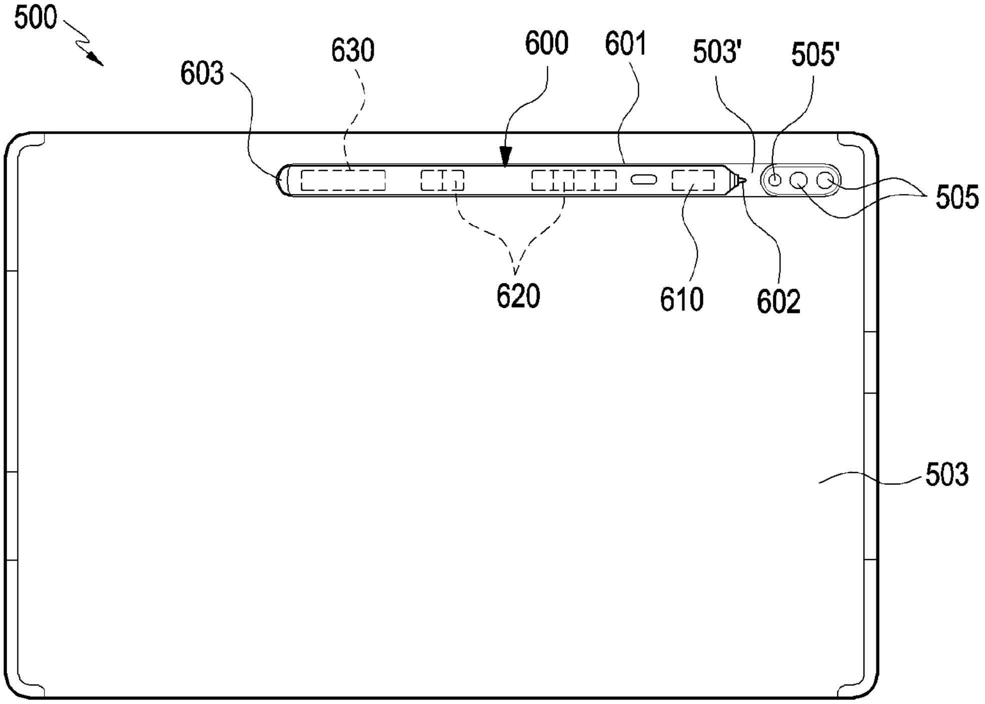
FIG. 5 is a view illustrating an electronic device and a state in which a pen input device is aligned on a surface of the electronic device according to various embodiments.

FIG. 5 is a view illustrating an electronic device 500 and a state in which a pen input device 600 is aligned on a surface of the electronic device 500 according to various embodiments.

The pen input device (e.g., stylus pen) 600 may be attached to one surface of the housing of the electronic device 500. According to an embodiment, as shown in FIG. 5, the pen input device 600 may be attached to a portion of the second plate 503 (e.g., rear plate) of the housing. According to another embodiment, as described below with reference to FIG. 15, the pen input device 600 may be attached to a portion of a side member (e.g., side member 218 of FIG. 2) of the housing. According to another embodiment, an attaching guide area 503' may be provided on one surface of the housing. The attaching guide area 503' may be an indication area indicating the attaching position of the pen input device 600. According to an embodiment, a guide groove may be formed to indicate the attaching position of the pen input device 600. According to another embodiment, as the attaching guide area 503' is formed of a material different from other portions of the housing (e.g., the housing is a metallic material, and the attaching guide area is a non-conductive material, such as glass), the attaching position may be indicated. According to another embodiment, the attaching guide area 503' may be formed to have a different color from other portions of the housing to indicate the attaching position.

According to an embodiment shown in FIG. 5, the attaching guide area 503' is formed in a position adjacent to the camera module 505 (e.g., the second camera module 205-2 of FIG. 3) of the second plate 503. According to an embodiment, the attaching guide area 503' may be shaped to extend in one direction from the area where the camera module 505 is formed. For example, the attaching guide area 503' may be shaped to extend from an enclosure of the camera module 505 in the length direction of the electronic device 500 (e.g., the Y-axis direction of FIG. 2).

According to various embodiments, the pen housing 601 of the pen input device 600 has an elongated body as a whole and may include a first end 602 and a second end 603 positioned opposite to each other with the body interposed therebetween. Here, the first end 602 may have a shape in which the width reduces towards the end. The first end 602 may include a pen tip for the user to apply pressure to the display and implement a user input (e.g., writing) on the electronic device. The inside of the pen housing 601 may include an inner space 604 surrounded by the body and the first end 602 and the second end 603. According to various embodiments, at least a portion of the pen housing 601, e.g., the body, may be formed of a synthetic resin (e.g., plastic) material. Another portion of the pen housing 601 may be formed of, e.g., a metallic material (e.g., aluminum or SUS).

The pen input device 600 may include a coil 610, at least one magnetic substance 620, and a battery 630 inside the pen housing 601.

According to an embodiment, the pen input device 600 may operatively interwork with the electromagnetic induction panel 370 (e.g., digitizer) using the coil, through an electromagnetic resonance (EMR) scheme, an active electrical stylus (AES), and an electric coupled resonance (ECR) scheme. According to another embodiment, the coil 610 may interwork with a wireless charging coil (e.g., the wireless charging coil 510 of FIG. 6) included in the electronic device 500. The coil 610 may perform a function of wirelessly charging the battery 630 by being coupled with the wireless charging coil (e.g., the wireless charging coil 510 of FIG. 6) included in the electronic device 500. According to various embodiments, the resonance with the electromagnetic induction panel (e.g., the electromagnetic induction panel 370 of FIG. 4) and the function of wirelessly charging the battery 630 may be implemented using one coil 610 included in the pen input device 600.

The pen input device 600 may be attached or detached to/from the outside, e.g., the attaching guide area 503', of the housing of the electronic device 500. The pen input device 600 may be disposed to overlap the attaching guide area 503' in the same length direction. The inside of the pen housing 601 may include at least one magnetic substance 620 to facilitate attachment to the attaching guide area 503', which may be formed to overlap in a position corresponding to at least one magnetic substance (e.g., at least one magnetic substance 520 of FIG. 6 to be described below) disposed in the electronic device. According to an embodiment, when at least one magnetic substance 620 included in the pen input device 600 is disposed in a position overlapping at least one magnetic substance (e.g., at least one magnetic substance 520 of FIG. 6 described below) disposed in the electronic device 500, the pen input device 600 may be attached to the attaching guide area 503' by the action of attraction and/or repulsion between the magnetic substances. The at least one magnetic substance 620 included in the pen input device 600, together with the at least one magnetic substance (e.g., at least one magnetic substance 520 of FIG. 6 described below) disposed in the electronic device 500, may be disposed precisely in a designated position of the attaching guide area 503' by the repulsion between the same poles and the attraction between different poles. According to another embodiment, when at least one magnetic substance 620 is not disposed in a position overlapping at least one magnetic substance (e.g., at least one magnetic substance 520 of FIG. 6 described below) disposed in the electronic device 500, the pen input device 600 may not be attached to the attaching guide area 503' but be misaligned by the repulsion between the magnetic substances. According to an embodiment, the case where when the pen input device 600 is disposed to overlap the attaching guide area 503' in the length direction, the first end 602 where the pen tip is positioned is disposed adjacent to the position corresponding to the wireless charging coil 510 of the electronic device 500 may be referred to as forward attachment. Further, the case where when the pen input device 600 is disposed to overlap the attaching guide area 503' in the length direction, the second end 603 of the pen input device 600 is disposed adjacent to the position corresponding to the wireless charging coil 510 may be referred to as reverse attachment. In an embodiment, as described above, when the pen input device 600 is attached reversely with respect to the wireless charging coil 510 of the electronic device 500, the pen input device 600 may not be subjected to wireless charging and thus may require recharging for use.

According to various embodiments of the disclosure, a function as a remote control input device using short-range communication may be performed separately from the pen input function using the pen input device 600. For example, the pen input device 600 may be utilized as a pen input device 600 for performing active functions (e.g., BLE communication), rather than a mere writing tool, by including a communication circuit, an antenna, and a battery 630. The battery 630 attached to the pen input device 600 is not limited to any specific battery. For example, a chip-type battery or a cylinder-type battery may be used as the battery 630. The position of the battery 630 attached to the pen input device 600 is not limited to any specific embodiment. In the embodiment shown in FIG. 5, it is shown that the battery 630 is disposed on the side of the second end 603 of the pen input device 600, but the battery 630 may otherwise be disposed between the magnetic substances 620, and such various embodiments are applicable.

Configurations of the electronic device 500 and the pen input device 600, wireless charging operations between the electronic device 500 and the pen input device 600, and a method for recognizing a misalignment between the electronic device 500 and the pen input device 600 are described below in detail with reference to FIGS. 6 to 18. For convenience of description, at least one magnetic substance (e.g., the at least one magnetic substance 520 of FIG. 6 described below) disposed in the electronic device 500 may be referred to as a 'first magnetic substance group 520', and at least one magnetic substance 620 included in the pen input device 600 may be referred to as a 'second magnetic substance group 620'.

Figure 6:
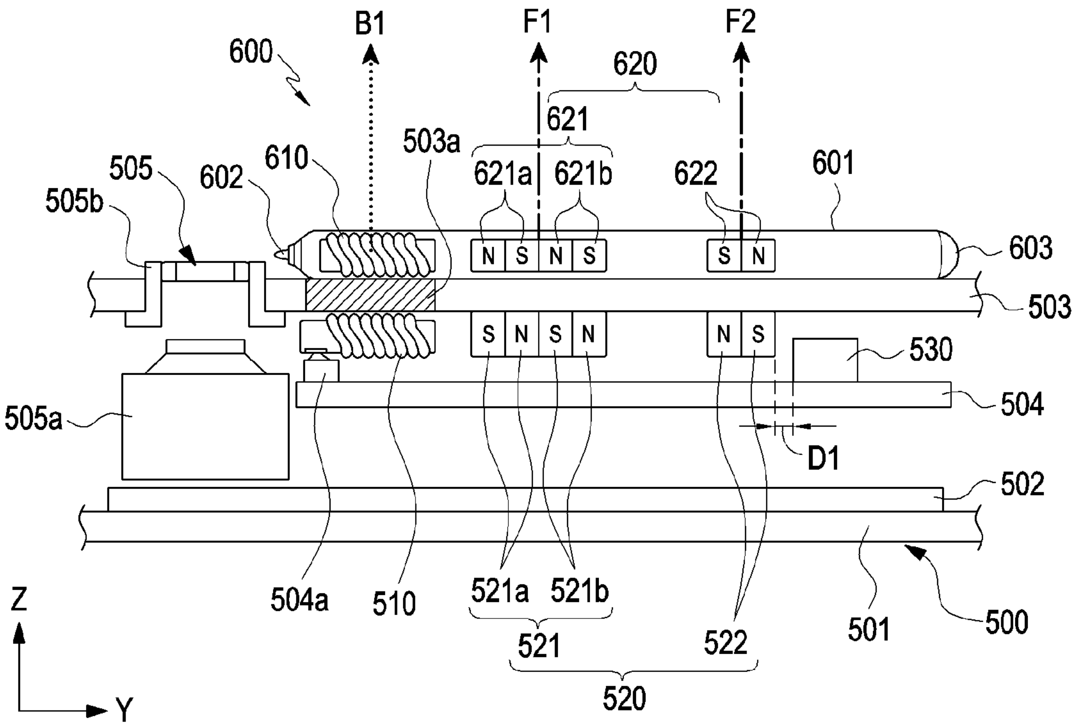
FIG. 6 is a view illustrating a state in which a pen input device is attached to an electronic device in a forward direction according to an embodiment of the disclosure.

FIG. 6 is a view illustrating a state in which a pen input device 600 is attached to an electronic device 500 in a forward direction according to various embodiments of the disclosure.

Figure 7:
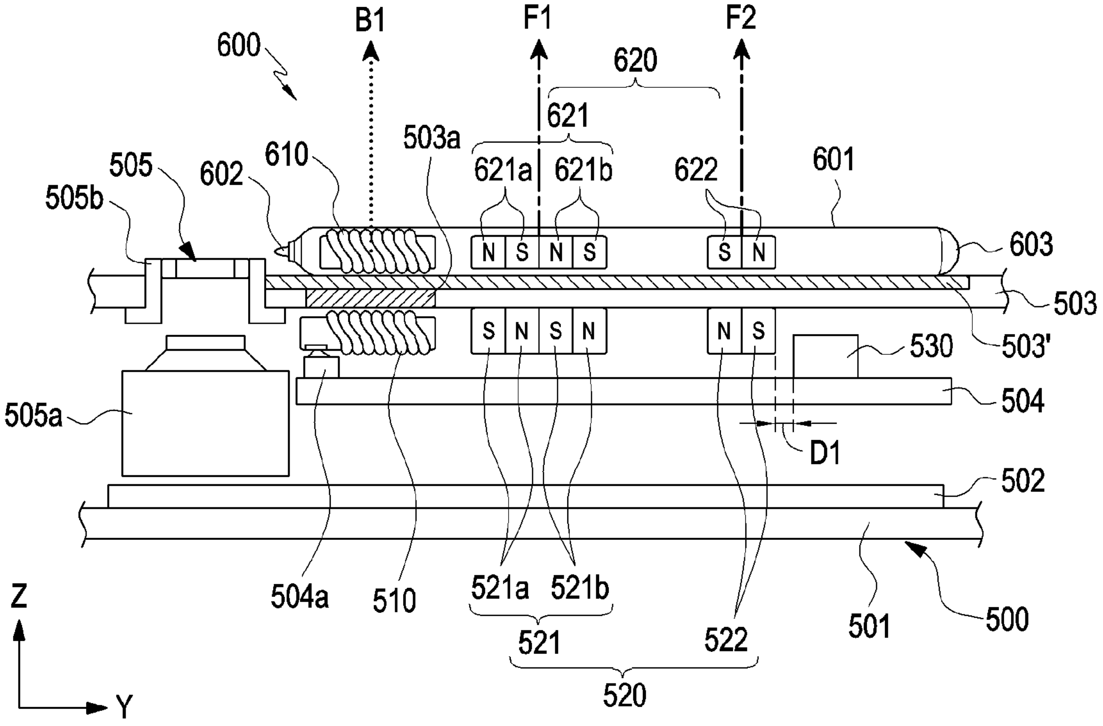
FIG. 7 is a view illustrating a state in which a pen input device is attached to an attaching guide area of an electronic device according to an embodiment of the disclosure.

FIG. 7 is a view illustrating a state in which a pen input device is attached to an attaching guide area of an electronic device according to an embodiment of the disclosure. Referring to FIGS. 6 and 7, according to various embodiments, an electronic device 500 may include a housing receiving electronic components in an inner space, a wireless charging coil 510 disposed on an inner surface of the housing forming the inner space, a first magnetic substance group 520 disposed on an inner surface of the housing and aligned with the wireless charging coil in a first direction, and a magnetic field sensor 530 spaced apart from the first magnetic substance group by a predetermined distance to recognize reverse attachment of the pen input device which is attachable to the electronic device. The electronic device 500 may further include a printed circuit board 504 for mounting the electronic components.

The housing (e.g., the housing 210 of FIGS. 2 and 3) of the electronic device may include a first plate 501 (e.g., the first plate 202 of FIG. 2), a second plate 503 (e.g., the second plate 211 of FIG. 3), and a side member (e.g., the side member 506 of FIG. 15 described below) surrounding the space between the first plate 501 and the second plate 503. The first plate 501 may form the front surface of the electronic device 500 and be formed to be substantially transparent to externally expose the display 502 positioned on the rear surface. The second plate 503 is a part of the housing facing in the opposite direction to the first plate 501 and may form the rear surface of the electronic device 500.

A plurality of electronic components may be disposed in an inner space between the first plate 501 and the second plate 503. FIGS. 6 and 7 disclose a camera module 505 (e.g., the camera module 205-2 of FIG. 3) equipped with an optical lens system 505*a* to obtain visual information through the opening formed in the rear enclosure 505*b* of the electronic device 500. The optical lens system 505*a* may include an image sensor and a lens assembly. Further, other various electronic components than the camera module 505 may be disposed in the inner space between the first plate 501 and the second plate 503. For example, as the electronic components, a charging circuit 507, a processor 508, and a sensing circuit 509, described below with reference to FIG. 15 may be included.

The pen input device 600 may be attached to the outer surface of the second plate 503 of the housing of the electronic device. Referring to FIG. 7, the second plate 503 may have an attaching guide area 503' to allow the user to easily recognize the attachment position of the pen input device 600 and attach it. According to an embodiment, the attaching guide area 503' may be formed of a material different from that of the second plate 503. For example, when the second plate 503 is formed of a metallic material, the second plate 503 may include glass. Correspondingly, a wireless charging coil 510 and a first magnetic substance group 520 may be disposed on an inner surface of the second plate 503 among a plurality of inner surfaces constituting the inner space of the housing of the electronic device.

Figure 15:
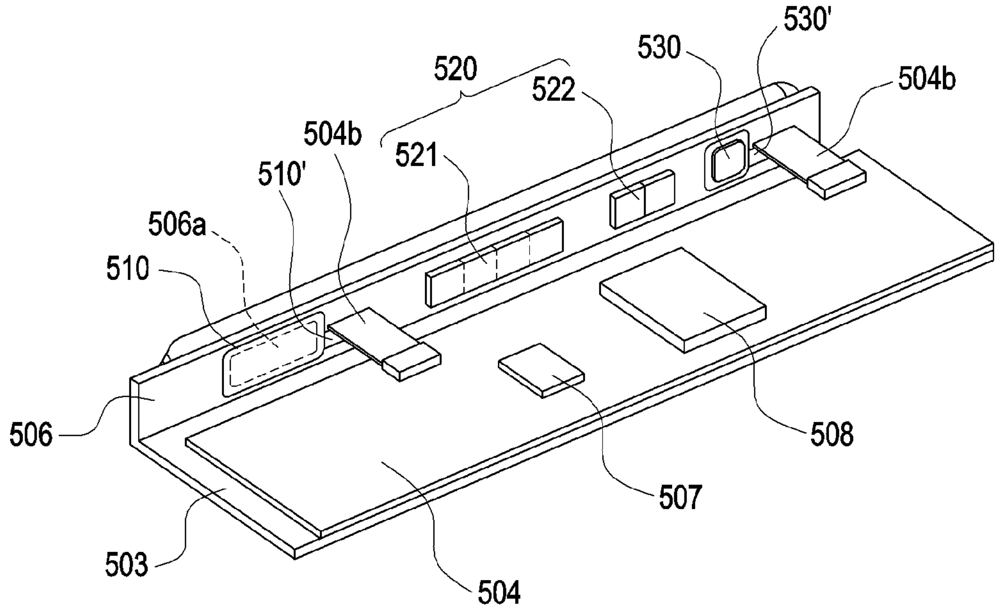
FIG. 15 is a view illustrating a pen input device attached to a side member and an internal configuration of an electronic device corresponding thereto according to various embodiments.

The wireless charging coil 510 is a component for wirelessly charging the battery 630 of the pen input device 600, and may be a coil for power transmission, which is coupled with the coil 610 of the pen input device 600 to transmit power. The wireless charging coil 510 may be electrically connected to a charging circuit (e.g., the charging circuit 507 of FIG. 15 described below) on the printed circuit board through a connector 504*a* mounted on the printed circuit board 504. The connector 504*a* mounted on the printed circuit board 504 is not limited to any specific embodiment. For example, the connector 504*a* may be a connector 504*a* in the form of a contact structure (e.g., C-clip) to contact the wireless charging coil 510 as shown in FIGS. 6 and 7 or, unlike shown in the drawings, may be an FPCB-type connector fastened to the wireless charging coil 510. According to another embodiment, the connector 504*a* may be an FPCB connector (connector 504*b*) integrally configured with the wireless charging coil as shown in FIG. 15.

As the wireless charging technology using the wireless charging coil 510 between the electronic device 500 and the pen input device 600, any one of an electromagnetic induction scheme, a resonance scheme using resonance, and RF/microwave radiation scheme to convert electrical energy into electromagnetic waves and transfer it may be applied. For example, the power transmission method by electromagnetic induction is a scheme for transmitting power using electromagnetic induction between a primary coil (e.g., wireless charging coil 510) and a secondary coil (e.g., coil 610). If alternating current flows through the primary coil (e.g., wireless charging coil 510) of the electronic device 500, a magnetic field whose direction changes over time is generated around the primary coil (e.g., wireless charging coil 510), and an induced electromotive force is generated at the secondary coil (e.g., the coil 610) of the receiving end by the magnetic field, so that power is transferred to the pen input device 600. Here, according to an embodiment, the wireless charging coil 510 of the electronic device 500 may be a planar coil in the form of an FPCB, and the coil 610 of the pen input device 600 may be a solenoid-type winding coil. Alternatively, both the wireless charging coil 510 and the coil 610 may be solenoid-type winding coils. When the wireless charging coil 510 and the coil 610 are solenoid-type winding coils, the winding coil may be wound around a ferrite core.

Since the wireless charging technology using the electromagnetic induction scheme requires a short distance between the first coil and the second coil for power transmission and reception, the distance between the electronic device 500 and the pen input device 600 may need to be short.

According to an embodiment, an opening 503*a* may be formed on one side of the second plate 503 of the electronic device 500 to increase wireless charging efficiency between the electronic device 500 and the pen input device 600. For example, the second plate 503 of the electronic device 500 may be formed of a metallic material. Interference with coupling between the wireless charging coil 510 and the coil 610 may occur due to the second plate 503 being formed of metal, reducing power transmission efficiency. However, it is possible to prevent a reduction in power transmission efficiency by providing the opening 503*a*.

According to another embodiment, to increase wireless charging efficiency, the wireless charging coil 510 may be disposed on the inner surface of the housing of the electronic device 500. For example, the wireless charging coil 610 may be placed in tight contact with the inner surface of the housing of the electronic device 500. According to an embodiment, the wireless charging coil 610 may be disposed to overlap the opening 503*a*.

For example, as shown in FIG. 6, when the coil 610 of the pen input device 600 and the wireless charging coil 510 of the electronic device 500 are arranged in parallel to each other in their corresponding positions with the second plate 503 disposed therebetween (forward attachment state), the wireless charging coil 510 and the coil 610 overlap each other, so that the induced electromotive force generated from the coil 610 by the magnetic field generated from the wireless charging coil 510 may be largest, and the optimal wireless charging efficiency may be exerted.

The first magnetic substance group 520 may be at least one magnetic substance disposed inside the electronic device 500, and the first magnetic substance group 520 may be disposed, fixed in position, on the inner surface of the housing of the electronic device 500. Further, the first magnetic substance group 520 may be aligned with the wireless charging coil 510 disposed on the inner surface of the housing in the first direction. Here, the first direction may mean a direction (−Y) opposite to the direction in which the coordinate axis Y is directed in the embodiment shown in FIG. 6.

According to various embodiments, the first magnetic substance group 520 may include a plurality of magnetic substances. For example, as in the embodiments shown in FIGS. 6 and 7, the first magnetic substance group 520 may include a 1-1th magnetic substance 521 and a 1-2th magnetic substance 522. At least one of the 1-1th magnetic substance 521 and the 1-2th magnetic substance 522 may have a plurality of array polarities. In the disclosure, that a magnetic substance has a single polarity may mean that only dipoles of N-pole and S-pole exist in the magnet. That a magnetic substance has multiple array polarities may mean that the polarity changes depending on the length or position of the magnet in one magnet to alternately magnetize with the N pole and the S pole (hereinafter referred to as 'N-S polarity'). According to an embodiment, the 1-1th magnetic substance 521 has a plurality of array polarities, including a first portion 521*a* having a first polarity and a second portion 521*b* having a second polarity, and the 1-2th magnetic substance 522 may have a single polarity.

According to various embodiments of the disclosure, the 1-1th magnetic substance 521 may have more array polarities than the 1-2th magnetic substance 522 or have a longer shape, so that the 1-1th magnetic substance 521 and the 1-2th magnetic substance 522 may have an asymmetrical magnetic structure with respect to each other. Further, by allowing the 1-1th magnetic substance 521 adjacent to the wireless charging coil 510 to have a stronger magnetic force than the 1-2th magnetic substance 522, it is possible to facilitate attachment and detachment during wireless charging. According to another embodiment, at least one of the 1-1th magnetic substance 521 and the 1-2th magnetic substance 522 may be formed of a plurality of magnet sets.

For example, the 1-1th magnetic substance 521 may be formed of two magnets. The 1-2th magnetic substance 522 may be formed of a single magnet. Here, the two magnets included in the 1-1th magnetic substance 521 may be connected and formed in a state of being alternately magnetized with polarities.

According to an embodiment shown in FIGS. 6 and 7, it is shown that the 1-1th magnetic substance 521 is disposed such that the S polarity faces the wireless charging coil 510, but is not necessarily limited thereto. It is shown that the 1-2th magnetic substance 522 is disposed such that the N polarity faces the 1-1th magnetic substance 521, but is not necessarily limited thereto. Although not shown in the drawings, both the 1-1th magnetic substance 521 and the 1-2th magnetic substance 522 may be formed of magnets having a plurality of array polarities. For example, the 1-1th magnetic substance 521 may be formed in a state of being magnetized with the N-S polarities alternately three or more times, and the 1-2th magnetic substance 522 may be formed in a state of being magnetized with the N-S polarities alternately two or more times. Other various embodiments are described below with reference to FIGS. 12 to 14.

According to an embodiment, the first magnetic substance group 520 may be provided to correspond to the second magnetic substance group 620 provided in the pen input device 600. For example, the number of magnets, the polarities of magnets, and the interval between the magnets of the 1-1th magnetic substance 521 and the 1-2th magnetic substance 522 of the first magnetic substance group 520 may be determined corresponding to the number of magnets, the polarities of magnets, and the interval between the magnets of the 2-1th magnetic substance 621 and the 2-2th magnetic substance 622 included in the second magnetic substance group 620 of the pen input device 600. According to an embodiment shown in FIG. 6, the 2-1st magnetic substance 621 included in the second magnetic substance group 620 may be formed of a magnet having a plurality of array polarities, and the 2-2th magnetic substance 622 may be formed of a magnet having a single polarity. Correspondingly, the 1-1th magnetic substance 521 included in the first magnetic substance group 520 may be formed of a magnet having a plurality of array polarities, and the 1-2th magnetic substance 522 may be formed of a magnet having a single polarity. When the pen input device 600 is attached to the electronic device 500 in the forward direction, the magnet having a plurality of array polarities (e.g., 521*a* and 521*b*) included in the 1-1th magnetic substance 521 may cause attraction or repulsion in response to the plurality of array polarities 621*a* and 621*b* included in the 2-1th magnetic substance 621.

According to various embodiments of the disclosure, the first magnetic substance group 520 and the second magnetic substance group 620 may have an asymmetric magnet structure with different lengths. According to an embodiment, in an embodiment in which the first magnetic substance group 520 includes a 1-1th magnetic substance 521 and a 1-2th magnetic substance 522 and, correspondingly thereto, the second magnetic substance group 620 includes a 2-1st magnetic substance 621 and a 2-2th magnetic substance 622, the 1-1 th magnetic substance 521 may be formed to be longer than the 1-2th magnetic substance 621, and the 2-1th magnetic substance 621 may be formed to be longer than the 2-2th magnetic substance 622. According to another embodiment, in an embodiment in which the first magnetic substance group 520 includes a 1-1th magnetic substance 521 and a 1-2th magnetic substance 522 and, correspondingly thereto, the second magnetic substance group 620 includes a 2-1th magnetic substance 221 and a 2-2th magnetic substance 622, the 1-1th magnetic substance 521 and the 2-1th magnetic substance 621 may be formed as magnets having a plurality of array polarities, and the 1-2th magnetic substance 522 and the 2-2th magnetic substance 622 may be formed as magnets having a single polarity. According to another embodiment, in an embodiment in which the first magnetic substance group 520 includes a 1-1 th magnetic substance 521, and the second magnetic substance group 620 includes a 2-1th magnetic substance 621, the 2-1th magnetic substance 621 may be formed to be longer than the 1-1th magnetic substance 521, or the 2-1th magnetic substance 621 may be formed to have more array polarities than the 1-1th magnetic substance 521, or the 2-1th magnetic substance 621 may be formed to configure more magnet sets than the 1-1th magnetic substance 521. Other various embodiments may be applied to the asymmetric magnet structures of the first magnetic substance group 520 and the second magnetic substance group 620.

According to various embodiments of the disclosure, the electronic device 500 may include a magnetic field sensor 530 spaced apart from the first magnetic substance group 520 by a predetermined distance. For example, the magnetic field sensor 530 may be disposed to be spaced apart from the 1-2th magnetic substance 522, which is most adjacent to the magnetic field sensor 530, by distance D1 as shown in FIGS. 6 and 7. The distance 'D1' may be a distance at which the magnetic field sensor 530 does not recognize magnetic force equal to or larger than a threshold by the 1-2th magnetic substance 522. Since the magnetic field sensor 530 is provided to detect the magnetic force signal of the magnetic substance included in the pen input device 600, the magnetic field sensor 530 may be formed to be spaced apart by the distance to minimize influence by the magnetic substance provided in the electronic device 500. For example, D2 may be formed to be 5 mm or more. According to an embodiment, the magnetic field sensor 530 may be electrically connected with the sensing circuit (e.g., the sensing circuit 509 of FIG. 15) on the printed circuit board 504 in a state of being mounted on the printed circuit board 504 or fixedly disposed on the inner surface of the housing of the electronic device 500.

The magnetic field sensor 530 may also be aligned with the wireless charging coil 510 and the first magnetic substance group 520 in the first direction. Here, that the magnetic field sensor 530 is aligned with the wireless charging coil 510 and the first magnetic substance group 520 in the first direction may mean that the wireless charging coil 510, the first magnetic substance group 520, and the magnetic field sensor 530 are linearly arranged. For example, according to the embodiment shown in FIGS. 6 and 7, the wireless charging coil 510, the first magnetic substance group 520, and the magnetic field sensor 530 may be aligned in the first direction toward the camera module 505. In this case, the magnetic field sensor 530 may be positioned on the same plane as the wireless charging coil 510 and the first magnetic substance group 520, but is not necessarily limited thereto. For example, the wireless charging coil 510 and the first magnetic substance group 520 may be disposed on the inner surface of the housing, and the magnetic field sensor 530 may be disposed on the printed circuit board 504, and such other various embodiments may apply. Referring to FIGS. 6 and 7, the 1-1th magnetic substance 521 of the first magnetic substance group 520 may be disposed adjacent to the wireless charging coil 510, and the 1-2th magnetic substance 522 may be disposed adjacent to the magnetic field sensor 530. Here, the 1-1th magnetic substance 521 may be constituted with more array polarities than the 1-2th magnetic substance 522, more magnet sets (e.g., the embodiment of FIGS. 6 and 7), or longer magnets (e.g., the embodiment of FIG. 10 described below). Further, the thickness, as well as the length, may be relatively larger in the 1-1th magnetic substance 521 than the 1-2th magnetic substance 522. Accordingly, the 1-1th magnetic substance 521 may have a relatively stronger magnetic force than the 1-2th magnetic substance 522, and the 1-2th magnetic substance 522 may have a relatively weaker magnetic force than the 1-1th magnetic substance 521. Correspondingly, the 2-1th magnetic substance 621 of the pen input device 600 may be formed with more array polarities, more magnet sets (e.g., the embodiment of FIGS. 6 to 8), or longer magnets (e.g., the embodiment of FIG. 10 described below) than the 2-2th magnetic substance 622, so that the 2-1th magnetic substance 621 may thus have a relatively strong magnetic force, and the 2-2th magnetic substance 622 may have a relatively weaker magnetic force than the 2-1th magnetic substance 621. Since the 1-1th magnetic substance 521 and the 2-1st magnetic substance 621 have strong magnetic force, the pen input device 600 may be prevented from easily being detached from the electronic device 500 while being wirelessly charged.

According to various embodiments of the disclosure, the electronic device 500 may, or may not, wirelessly charge the pen input device 600 depending on the direction in which the pen input device 600 is attached to the housing. Or, although the direction in which the pen input device 600 is attached to the housing is forward direction, if the wireless charging coil 510 of the electronic device 500 is not disposed to overlap the coil 610 of the pen input device 600, the electronic device 500 may not perform the wireless charging operation. When not performing the wireless charging operation according to the direction of attachment of the pen input device 600 to the housing or the non-overlapping state between the wireless charging coil 510 and the coil 610, the electronic device 500 may perform determination as to the reverse attachment or tilted attachment and perform the function of notifying the user of it.

According to an embodiment shown in FIGS. 6 and 7, in the forward attachment state, the pen input device 600 may be attached to the electronic device 500 by a magnetic force generated between the 1-1th magnetic substance 521 and the 2-1th magnetic substance 621 and a magnetic force generated between the 1-2th magnetic substance 522 and the 2-2th magnetic substance 622, and the electronic device 500 may transmit power to the coil 610 through the wireless charging coil 510. The electronic device 500 may receive a charging signal (or pen tip signal) B1 by the coil 610 of the pen input device 600 and perform a wireless charging operation on the pen input device 600 according to a specific frequency signal using the wireless charging coil 510. In the forward attachment state, the magnetic flux F1 from the 2-1th magnetic substance 621 of the pen input device 600 and the magnetic flux F2 from the 2-2th magnetic substance 622 may not reach the magnetic field sensor 530.

Figure 8:
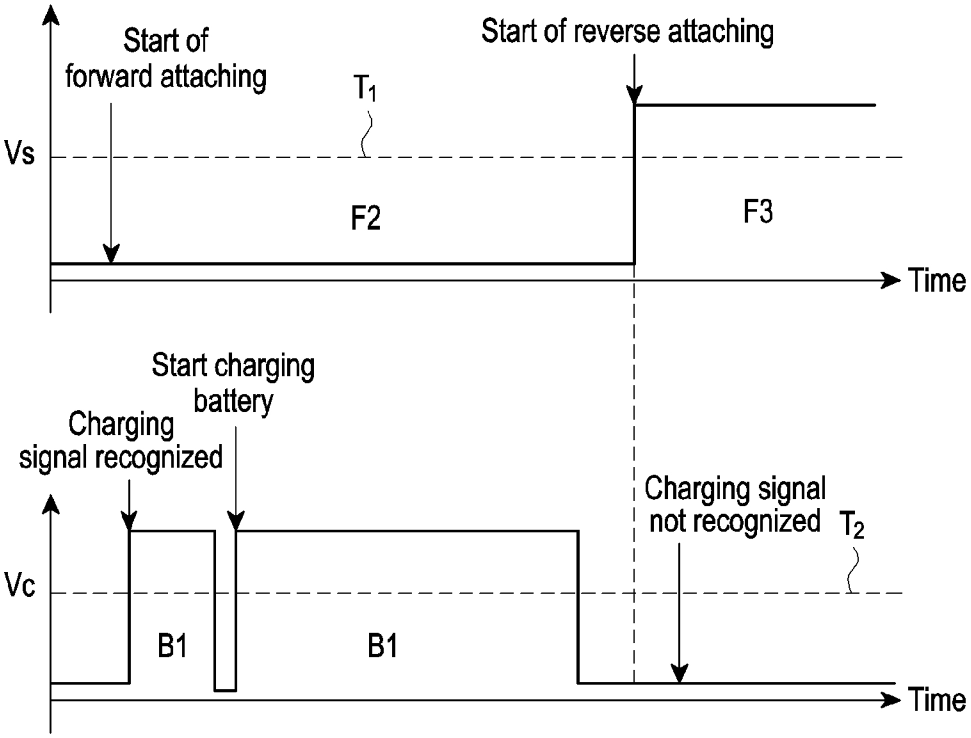
FIG. 8 is a signal-timing diagram illustrating a voltage strength acting on a wireless charging coil and a voltage strength acting on a magnetic field sensor.

FIG. 8 is a signal-timing diagram illustrating a voltage strength acting on a wireless charging coil and a voltage strength acting on a magnetic field sensor.

The electronic device 500 may determine the attachment state of the pen input device 600 using the charging signal (e.g., pen tip signal) of the pen input device 600 received through the wireless charging coil 510 and the magnetic force signal by the asymmetric magnet structure measured through the magnetic field sensor 530.

In FIG. 8, Vc may denote the voltage measured through the wireless charging coil 510, and Vs may denote the voltage measured through the magnetic field sensor 530. Referring to FIG. 8, in the forward attachment state of the pen input device 600, a voltage higher than a predesignated value T2 may be measured through the wireless charging coil 510. In the reverse attachment state of the pen input device 600, a voltage higher than a predesignated value T1 may be measured through the magnetic field sensor 530.

When the pen input device 600 is attached in the forward direction (start of forward attachment), the electronic device 500 may recognize the charging signal B1 but may not recognize the magnetic force signal through the magnetic field sensor 530. In this case, the electronic device 500 may perform the wireless charging operation on the battery of the pen input device 600.

Figure 9:
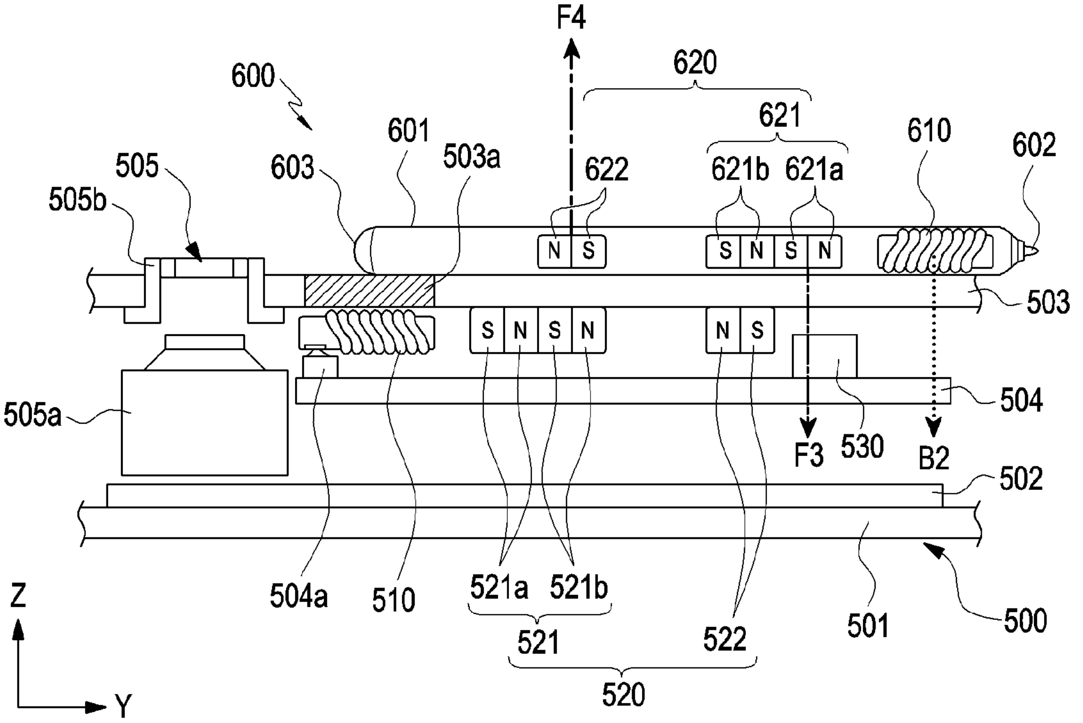
FIG. 9 is a view illustrating a state in which a pen input device is attached to an electronic device in a reverse direction according to an embodiment of the disclosure.

FIG. 9 is a view illustrating a state in which a pen input device 600 is attached to an electronic device 500 in a reverse direction according to an embodiment of the disclosure. The embodiment shown in FIG. 9 may represent part of embodiments in which the pen input device 600 is misaligned with the electronic device 500.

For example, as shown in FIG. 9, when the coil 610 of the pen input device 600 and the wireless charging coil 510 of the electronic device 500 are not arranged in parallel to each other in their corresponding positions with the second plate 503 disposed therebetween (reverse attachment or tilted attachment state), the wireless charging coil 510 and the coil 610 do not overlap each other, so that the induced electromotive force generated from the coil 610 by the magnetic field generated from the wireless charging coil 510 may be very small, or no induced electromotive force may be generated in the coil 610.

According to the embodiment shown in FIG. 9, in the reverse attachment state or tilted attachment state, the pen input device 600 may be attached to the electronic device 500 by a magnetic force generated between the 1-1th magnetic substance 521 and the 2-2th magnetic substance 622 and a magnetic force generated between the 1-2th magnetic substance 522 and the 2-1th magnetic substance 621. Since the wireless charging coil 510 of the electronic device 500 does not overlap the coil 610 of the pen input device 600 and therefore does not receive the pen tip signal (or charging signal) B2, power transmission to the coil 610 by the wireless charging coil 510 of the electronic device 500 may not be performed. In other words, no wireless charging operation may be performed on the pen input device 600. In the reverse or tilted attachment state, the magnetic flux F4 from the 2-2th magnetic substance 622 of the pen input device 600 does not reach the magnetic field sensor 530, but the magnetic flux F3 from the 2-1th magnetic substance 621 may reach the magnetic field sensor 530. In other words, when the pen input device 600 is in the reverse or tilted attachment state with respect to the electronic device 500, the magnetic field sensor 530 may be influenced by the magnetic force by the 2-1th magnetic substance 621 of the pen input device 600.

Referring to FIGS. 8 and 9 together, when the pen input device 600 is attached (start of reverse attaching) in the reverse direction (or tilted direction), the electronic device 500 may not recognize the charging signal B2 but may recognize the magnetic force signal F3 through the magnetic field sensor 530.

According to various embodiments, the processor (e.g., the processor 120 of FIG. 1) may determine whether the pen input device 600 is in the forward attachment state or reverse attachment state with respect to the electronic device 500 using the charging signal (e.g., pen tip signal) obtained through the wireless charging coil 510 and the magnetic force signal obtained through the magnetic field sensor 530 or may determine whether it is in the tilted attachment state using the variation in the magnitude of the measured magnetic force.

Figure 10:
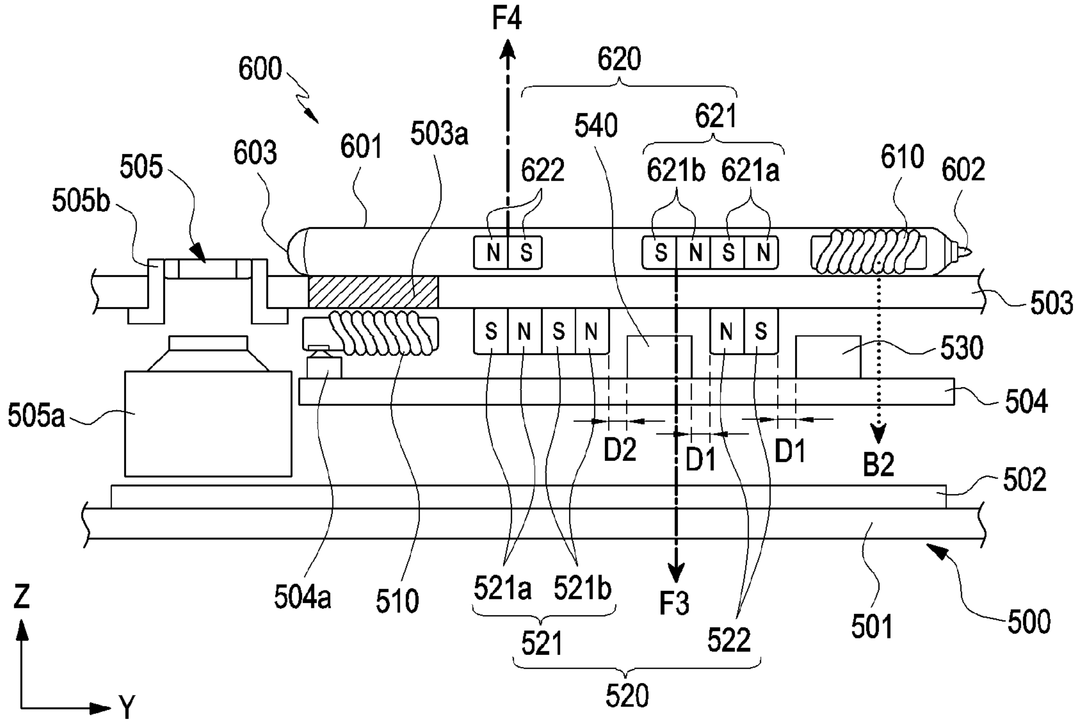
FIG. 10 is a view illustrating a state in which a pen input device is attached to an electronic device in a reverse direction according to another embodiment of the disclosure.
Figure 11:
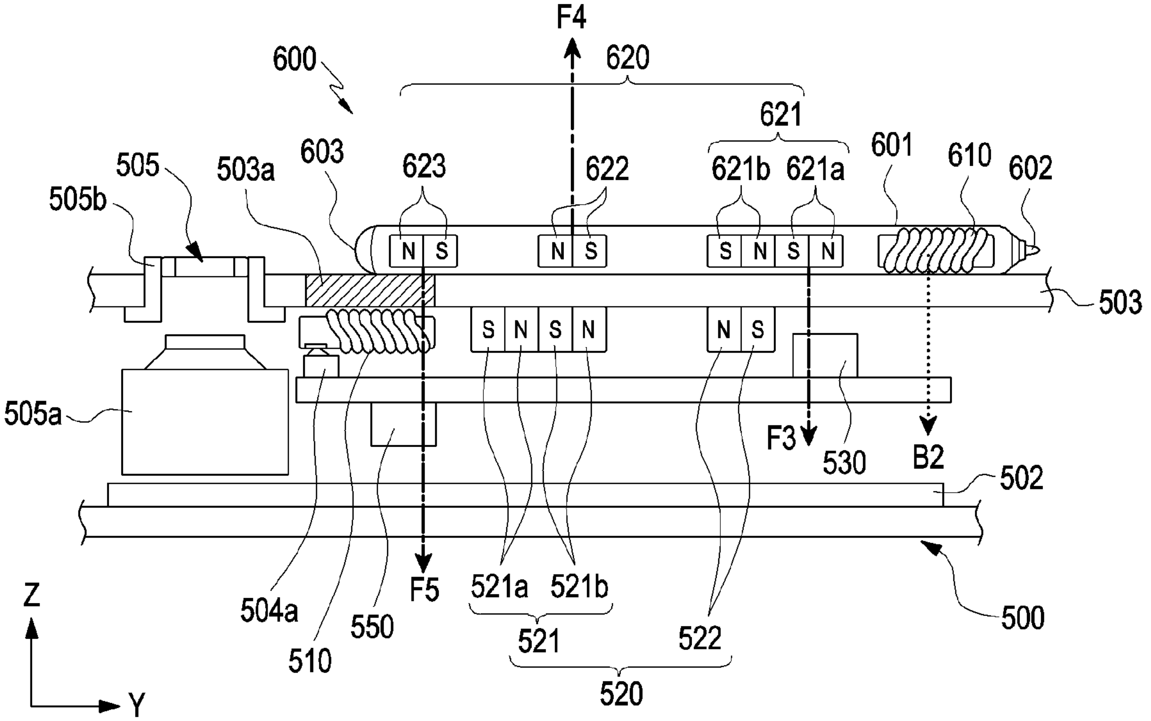
FIG. 11 is a view illustrating a state in which a pen input device is attached to an electronic device in a reverse direction according to another embodiment of the disclosure.

FIG. 10 is a view illustrating a state in which a pen input device 600 is attached to an electronic device 500 in a reverse direction according to other embodiments of the disclosure. FIG. 11 is a view illustrating a state in which a pen input device 600 is attached to an electronic device 500 in a reverse direction according to another embodiment of the disclosure. The embodiment of FIGS. 10 and 11 may be an embodiment different from the embodiment of FIG. 9 in which the pen input device 600 is misaligned with the electronic device 500.

The electronic device 500 may additionally or alternatively include a second magnetic field sensor 540 for the magnetic field sensor 530 (hereinafter, referred to as a 'first magnetic field sensor 530') facing in the opposite direction to the wireless charging coil 510 with respect to the first magnetic substance group 520. The second magnetic field sensor 540 may be disposed between the 1-1th magnetic substance 521 and the 1-2th magnetic substance 522 as in the embodiment shown in FIG. 10, as an example. If the second magnetic field sensor 540 is used, the magnetic force F3 which is difficult to measure by the first magnetic field sensor 530 may be measured according to the reverse attachment position of the pen input device 600. The second magnetic field sensor 540 may not be influenced by a threshold or more of magnetic force by being rendered to be spaced apart from the 1-2th magnetic substance 522 by distance 'D2' and to be spaced apart from the 1-1th magnetic substance 521 by distance 'D1'.

The electronic device 500 may additionally or alternatively include a third magnetic field sensor 550 for the first magnetic field sensor 530 and/or the second magnetic field sensor 540, as another magnetic field sensor. The third magnetic field sensor 550 may be disposed to overlap the wireless charging coil 510 in the height direction of the electronic device 500, as in the embodiment of FIG. 11, as an example. According to an embodiment, the third magnetic field sensor 550 may be disposed on the opposite surface of the printed circuit board 504 to minimize the influence by the magnetic force of the 1-1th magnetic substance 521. For example, when the pen input device 600 includes the 2-3th magnetic substance 623, as another magnetic substance, in addition to the 2-1th magnetic substance

621 and the 2-2th magnetic substance 622, it is possible to more accurately determine whether it is reversely attached or tiltedly attached by additionally or alternatively obtaining the magnetic flux F5 by the 2-3th magnetic substance 623 using the third magnetic field sensor 550.

In the following embodiment, other various embodiments of the above-described electronic device 500 and pen input device 600 are described.

Figure 12:
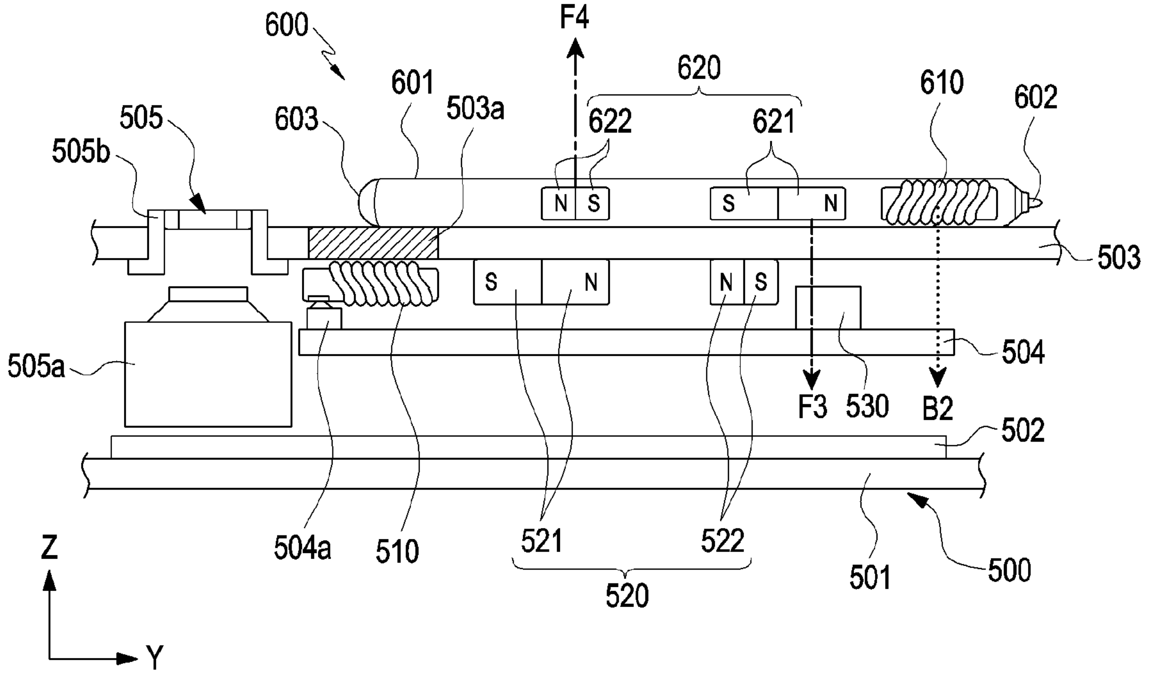
FIG. 12 is a view illustrating a state in which a pen input device is attached to an electronic device in a reverse direction according to another embodiment of the disclosure.

FIG. 12 is a view illustrating a state in which a pen input device 600 is attached to an electronic device 500 in a reverse direction according to another embodiment of the disclosure.

According to the embodiments shown in FIG. 12, the 2-1th magnetic substance 621 of the pen input device 600 is shaped to be longer than the 2-2th magnetic substance 622, and correspondingly thereto, the electronic device 500 may be shaped so that the 1-1th magnetic substance 521 is longer than the 1-2th magnetic substance 522. The 2-1th magnetic substance 621 and the 1-1th magnetic substance 521 may be larger than the 2-2th magnetic substance 622 and the 1-2th magnetic substance 522 in thickness as well as length and may thus be formed to have more stronger magnetic force.

Figure 13:
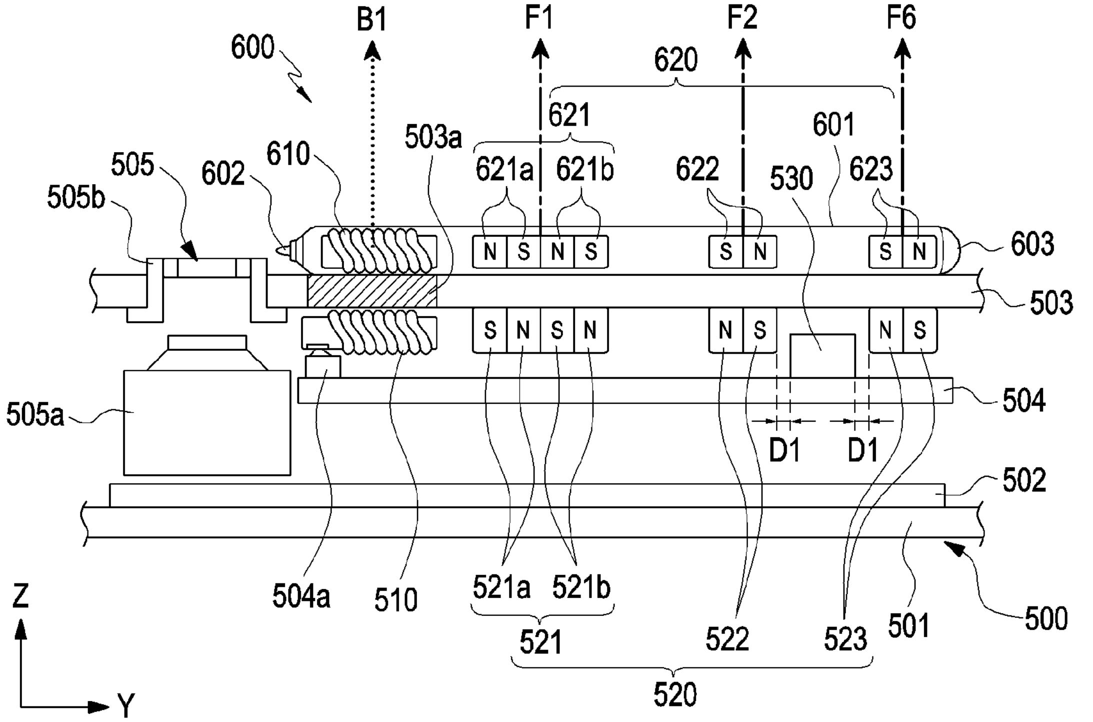
FIG. 13 is a view illustrating a state in which a pen input device is attached to an electronic device in a forward direction according to another embodiment of the disclosure.
Figure 14:
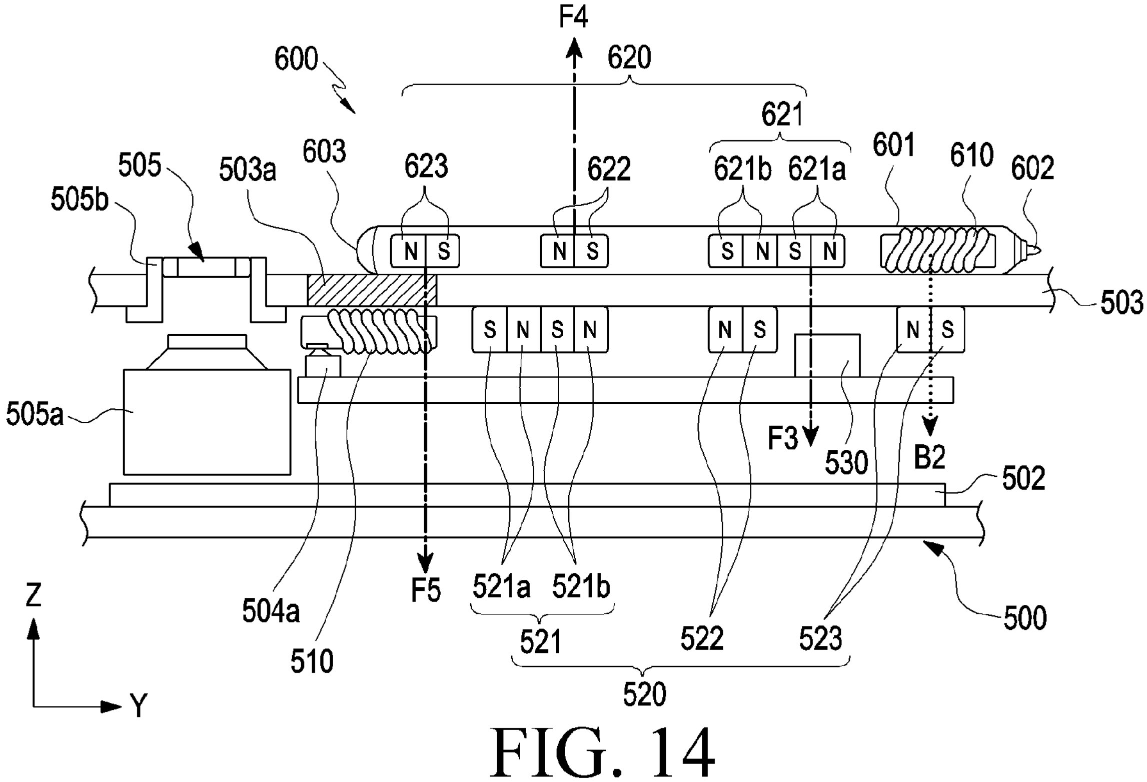
FIG. 14 is a view illustrating a state in which a pen input device is attached to an electronic device in a reverse direction according to another embodiment of the disclosure.

FIG. 13 is a view illustrating a state in which a pen input device 600 is attached to an electronic device 500 in a forward direction according to another embodiment of the disclosure. FIG. 14 is a view illustrating a state in which a pen input device 600 is attached to an electronic device 500 in a reverse direction according to another embodiment of the disclosure.

As mentioned through the embodiment of FIG. 11, the second magnetic substance group 620 of the pen input device 600 may include a 2-3th magnetic substance 623, as another magnetic substance, in addition to the 2-1th magnetic substance 621 and the 2-2th magnetic substance 622. The 2-1th magnetic substance 621, 2-2th magnetic substance 622, and 2-3th magnetic substance 623 may be aligned in the length direction of the pen input device 600. Correspondingly, the first magnetic substance group 520 of the electronic device 500 may include a 1-1th magnetic substance 521, a 1-2th magnetic substance 522, and a 1-3th magnetic substance 523 aligned in the first direction. In this case, at least one (e.g., the 201 th magnetic substance 621) of the 2-1th magnetic substance 621, the 2-2th magnetic substance 622, and the 2-3th magnetic substance 623 and at least one (e.g., the 1-1th magnetic substance 521) of the 1-1th magnetic substance 521, the 1-2th magnetic substance 522, and the 1-3th magnetic substance 523 may be configured to have more array polarities, larger lengths, larger thicknesses, or more magnet sets than the other magnetic substances, forming an asymmetric magnet structure.

The magnetic substance groups 520 and 620 of the pen input device 600 and the electronic device 500 receive attaching force in three separate portions in the forward attachment state, so that the pen input device 600 may be prevented from being easily detached from the electronic device 500 during the wireless charging operation.

The magnetic substance groups 520 and 620 of the pen input device 600 and the electronic device 500 may include more magnetic substances than those in the above-described embodiment, and the number of polarities, the number of magnets, and array aspects may be diversified according to embodiments.

FIG. 15 is a view illustrating a pen input device attached to a side member and an internal configuration of an electronic device corresponding thereto according to various embodiments.

According to the embodiment shown in FIG. 15, the pen input device 600 may be attached to the side member 506 of the electronic device 500. Although not shown, an attaching guide area (e.g., 503' of FIG. 5) may be formed on the surface of the side member 506, allowing the user to easily recognize the attachment position of the pen input device 600 and attach it. Correspondingly, the electronic device 500 may include a wireless charging coil 510, a first magnetic substance group 520, and a magnetic field sensor 530 disposed on the inner surface of the side member 506.

Referring to FIG. 15, the electronic device 500 may include a printed circuit board 504 for mounting electronic components. The electronic components mounted on the printed circuit board 504 may include other various electronic components in addition to the charging circuit 507, the processor 508 (e.g., the processor 120 of FIG. 1), and the sensing circuit 509.

Corresponding to the pen input device 600 attached to the side member 506, the wireless charging coil 510, the first magnetic substance group 520, and the magnetic field sensor 530 disposed on the inner surface of the side member 506 may be disposed perpendicular to the printed circuit board 504. According to an embodiment, for electrical connection with the charging circuit 507 and the sensing circuit 509, the wireless charging coil 510 and the magnetic field sensor 530 may be connected to the connector 504*b* extending to one side of the printed circuit board 504 using the first FPCB 510' and the second FPCB 530', respectively.

Figure 16:
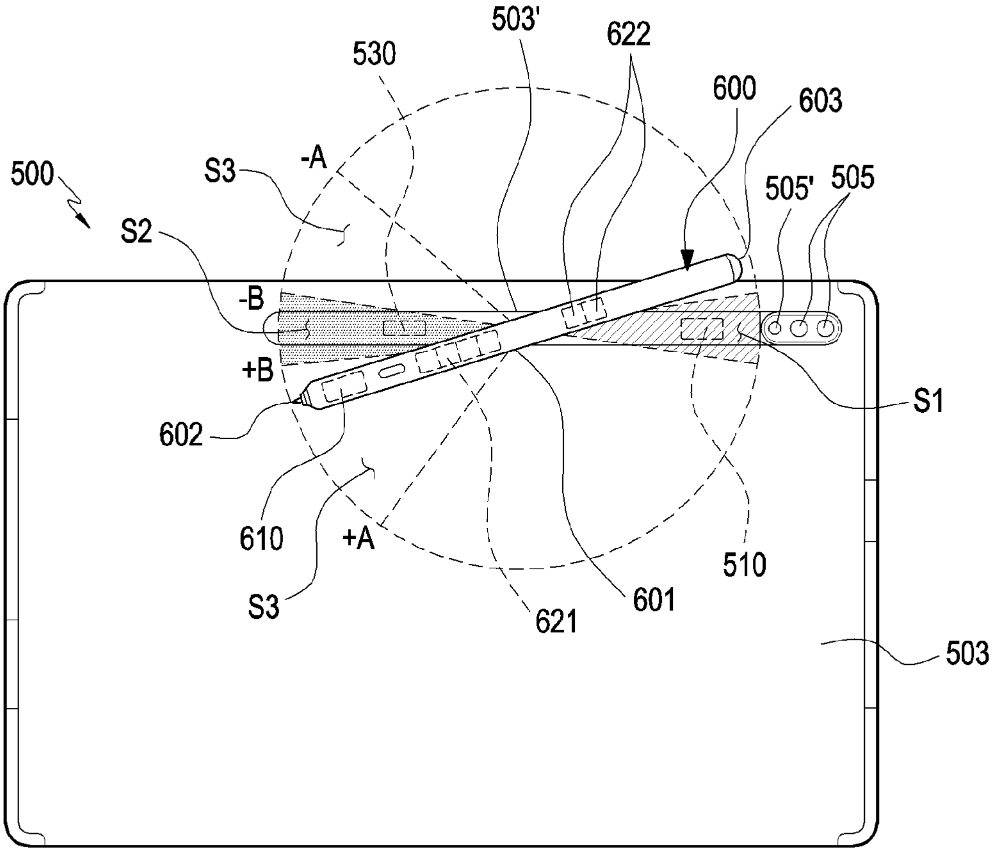
FIG. 16 is a view illustrating a reverse attachment state and tilted attachment state of a pen input device to an electronic device according to various embodiments of the disclosure.

FIG. 16 is a view illustrating an embodiment of distinguishing between a reverse attachment state and tilted attachment state of a pen input device 600 for an electronic device 500 according to various embodiments of the disclosure.

Referring to FIG. 16, the electronic device 500 may identify whether the pen input device 600 is attached reversely or tilted at a predetermined angle with respect to the attaching guide area 503' using the magnetic field sensor 530. For example, the magnetic field sensor 530 may be configured as a digital hall sensor (digital hall IC). The digital hall sensor is a sensor capable of measuring the strength of magnetic force formed on three axes in the coordinate space. The processor (e.g., the processor 120 of FIG. 1) may convert the vector sum in the X-axis, Y-axis, and Z-axis directions into an ADC output value using the data on the coordinate space detected by the digital hall sensor. By referring to the positive or negative value of the ADC output value, it is possible to determine how much the pen input device 600 is tilted in which direction (clockwise or counterclockwise direction) with respect to the attaching guide area 503'. For example, if the ADC output value output from the magnetic field sensor 530 is measured as 0, the processor 508 of the electronic device 500 may determine that the pen input device 600 is attached to a forward attachment section (e.g., S1). In contrast, if the ADC output value output from the magnetic field sensor 530 is measured as −B to +B, the processor (e.g., the processor 120 of FIG. 1) of the electronic device 500 may determine that the pen input device 600 is attached to a reverse attachment section (e.g., S2). Further, if the ADC output value output from the magnetic field sensor 530 is measured as −A to −B or +A to +B, the processor (e.g., the processor 120 of FIG. 1) of the electronic device 500 may determine that the pen input device 600 is attached to a tilted attachment section (e.g., S3).

Figure 17:
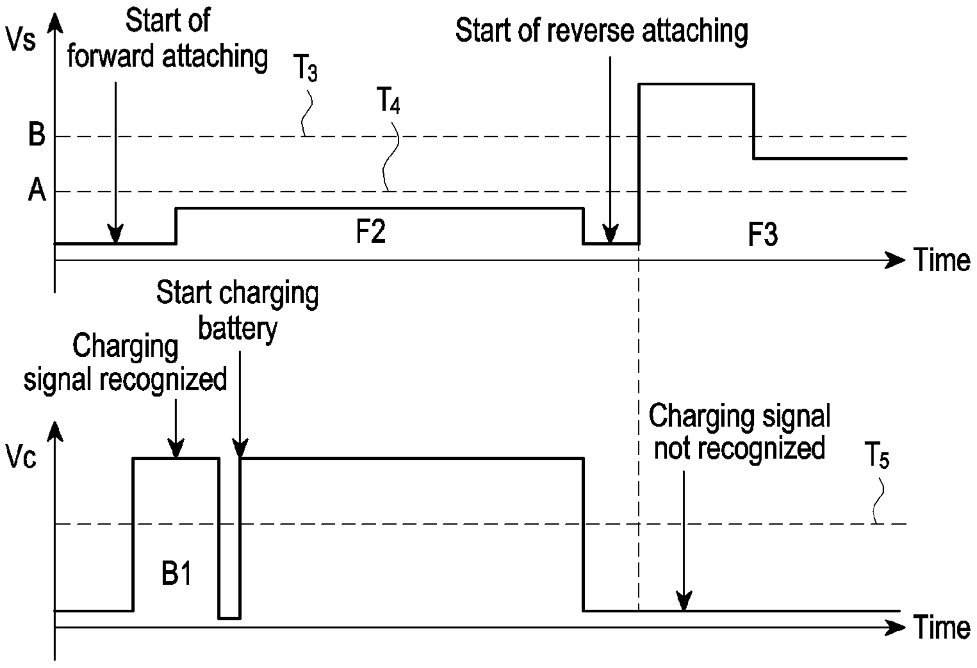
FIG. 17 is a signal-timing diagram illustrating a voltage strength acting on a wireless charging coil and a voltage strength acting on a magnetic field sensor, according to an embodiment different from that of FIG. 8.

FIG. 17 is a signal-timing diagram illustrating a voltage strength acting on a wireless charging coil and a voltage strength acting on a magnetic field sensor, according to an embodiment different from that of FIG. 8.

The electronic device 500 may determine the attachment state of the pen input device 600 using the charging signal (e.g., pen tip signal) of the pen input device 600 received through the wireless charging coil 510 and the magnetic force signal by the asymmetric magnet structure measured through the magnetic field sensor 530 (e.g., digital hall sensor). For example, the magnetic field sensor according to the embodiment of FIG. 8 may be an analog sensor. Accordingly, the measurement aspect for the magnetic field sensor according to the embodiment of FIG. 17 may be slightly different from that of FIG. 8.

In FIG. 17, Vc may denote the voltage measured through the wireless charging coil 510, and Vs may denote the voltage measured through the magnetic field sensor 530. Referring to FIG. 17, in the forward attachment state of the pen input device 600, a voltage higher than a predesignated value T5 may be measured through the wireless charging coil 510. In the reverse attachment state of the pen input device 600, a voltage higher than a predesignated value T3 or T4 may be measured through the magnetic field sensor 530.

When the pen input device 600 is attached in the forward direction (start of forward attaching), the electronic device 500 may recognize the charging signal B1 but may not recognize the magnetic force signal through the magnetic field sensor 530. In this case, the electronic device 500 may perform the wireless charging operation on the battery of the pen input device 600.

Referring to FIGS. 16 and 17 together, even when the pen input device 600 is attached in the forward direction, the pen input device 600 may be attached in a state of being partially tilted with respect to the electronic device 500. For example, even when the ADC output value output from the magnetic field sensor 530 is measured as a voltage below a predesignated value T3 or T4, the pen input device 600 may be determined to be attached in the forward direction. In this case, a wireless charging operation on the pen input device 600 by the electronic device 500 may be possible, but it may be determined that there may be a risk of the pen input device 600 being detached from the electronic device 500 or there is another cause of failure. For example, an obstacle may be around the pen input device 600 and, even when the pen input device 600 is attached in the forward direction due to damage to the magnetic field sensor 530, a voltage may be detected by the magnetic field sensor 530.

Figure 18:
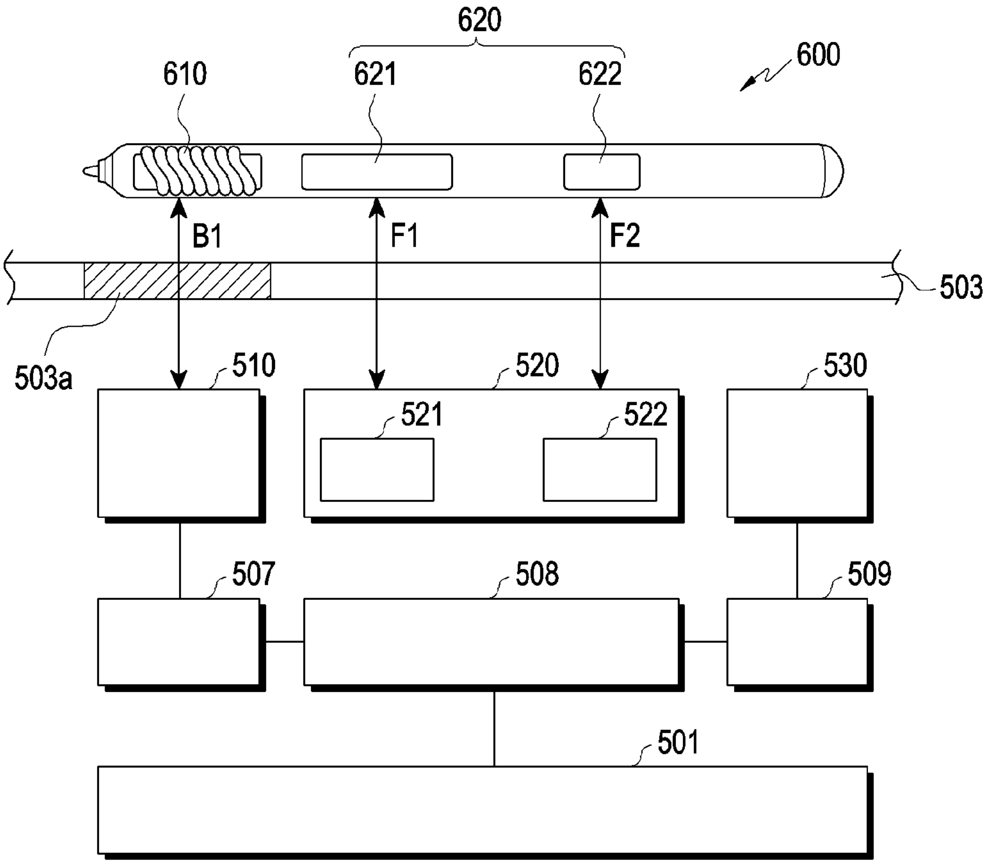
FIG. 18 is a block diagram illustrating a circuit configuration of an electronic device according to various embodiments of the disclosure.

FIG. 18 is a block diagram illustrating a circuit configuration of an electronic device 500 according to various embodiments of the disclosure.

According to various embodiments of the disclosure, the electronic device 500 may include at least one processor 508 (e.g., the processor 120 of FIG. 1). The coil 610 of the pen input device 600 may correspond to the wireless charging coil 510 of the electronic device 500. When the housing (e.g., the second plate 503) of the electronic device 500 is formed of a metal housing, wireless power transmission to the coil 610 may be performed through the opening **503*a* formed in the position corresponding to the wireless charging coil 510. The asymmetric magnetic substance structure 620 of the pen input device 600 may correspond to the asymmetric magnetic substance structure 520 of the electronic device 500. At least one magnetic field sensor 530 may be disposed to be spaced apart from the asymmetrical magnetic substance structure 520 of the electronic device 500 at a predetermined distance. The processor 508 may receive the magnetic force signal (e.g., magnetic force strength) for the asymmetric magnetic substance structure 620 measured through the magnetic field sensor 530 via the sensing circuit 509, receive the charging signal (e.g., pen tip signal) of the pen input device received through the wireless charging coil 510 via the charging circuit 507, and determine the reverse attachment state and tilted attachment state of the pen input device 600 corresponding to the magnetic force signal and the charging signal. Further, the processor 508 may control to provide an attaching guide message to the user through the display 502** corresponding to the determination result.

Figure 19:
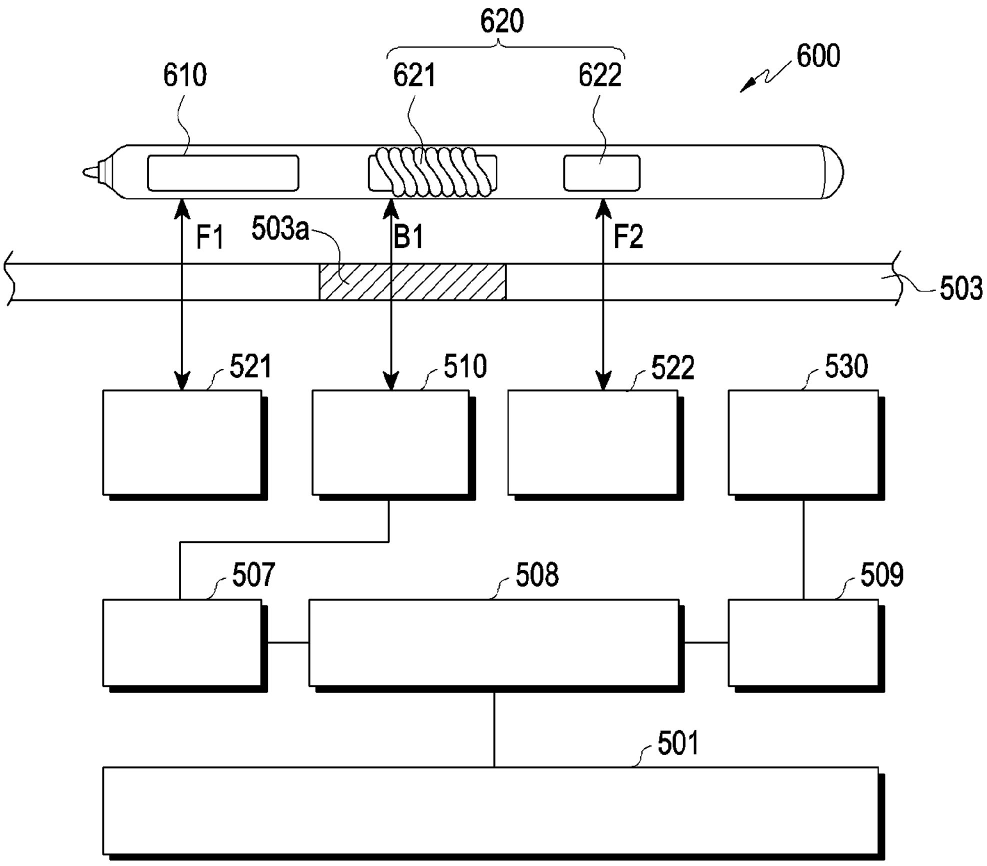
FIG. 19 is a block diagram illustrating a circuit configuration of an electronic device according to an embodiment different from that of FIG. 18.

FIG. 19 is a block diagram illustrating a circuit configuration of an electronic device 500 according to an embodiment different from that of FIG. 18.

According to various embodiments of the disclosure, the electronic device 500 may determine the attachment state for the pen input device 600 where the coil 610 is disposed in the body of the pen housing 601, not in the first end 602. In this case, the electronic device 500 may include a 1-1th magnetic substance 521 and a 1-2th magnetic substance 522 disposed before and behind the wireless charging coil 510 disposed corresponding to the coil 610, along the first direction. As such, the wireless charging coil 510 included in the electronic device 500 and the first magnetic substance group 520 may beset to have various positions according to embodiments. Despite such a diversity of embodiments, the processor 508 may determine the reverse attachment state and the tilted attachment state of the pen input device 600 corresponding to the charging signal (e.g., pen tip signal) of the pen input device received through the wireless charging coil 510 and the magnetic force signal (e.g., magnetic force strength) for the asymmetric magnetic substance structure 520 measured through the magnetic field sensor 530.

Figure 20:
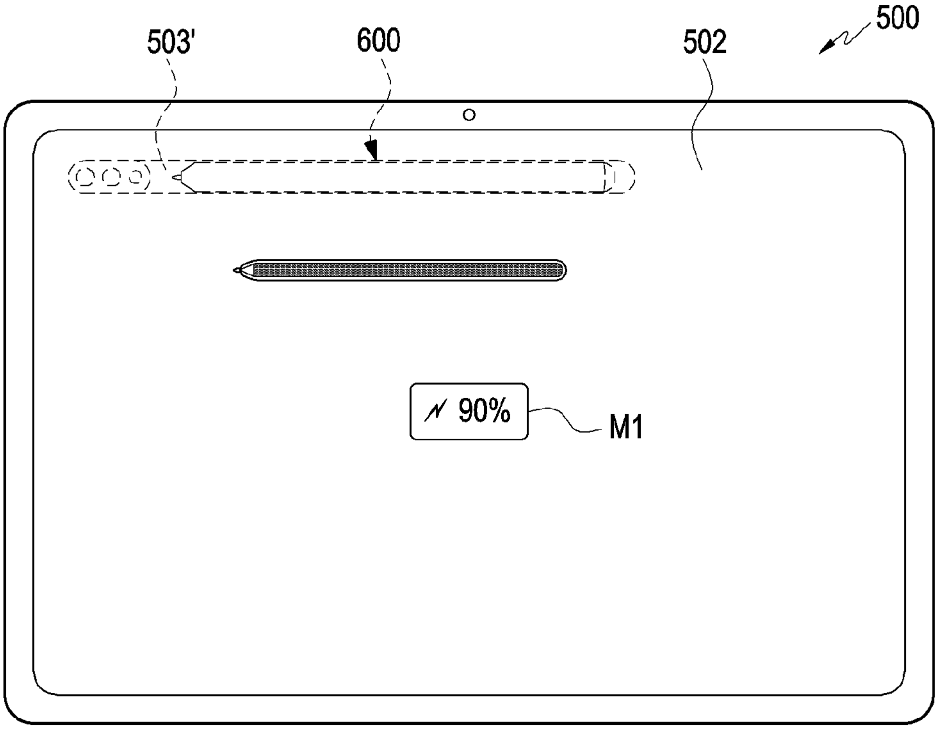
FIG. 20 is a view illustrating an attaching guide message displayed on an electronic device in a forward attachment state of a pen input device.

FIG. 20 is a view illustrating an attaching guide message displayed on an electronic device 500 in a forward attachment state of a pen input device 600.

The electronic device 500 may display a charging message through the display 502 corresponding to the forward attachment state of the pen input device 600. The electronic device 500 may display, through the display 502, the charging message including the battery power through the charging signal received corresponding to the forward attachment state of the pen input device 600 as shown in FIG. 15, as an example. According to an embodiment, the display 502 may display an image for the forward attachment state of the pen input device and display the current remaining battery power in percentage of the pen input device 600, thereby allowing the user to intuitively recognize the charging state.

Figure 21:
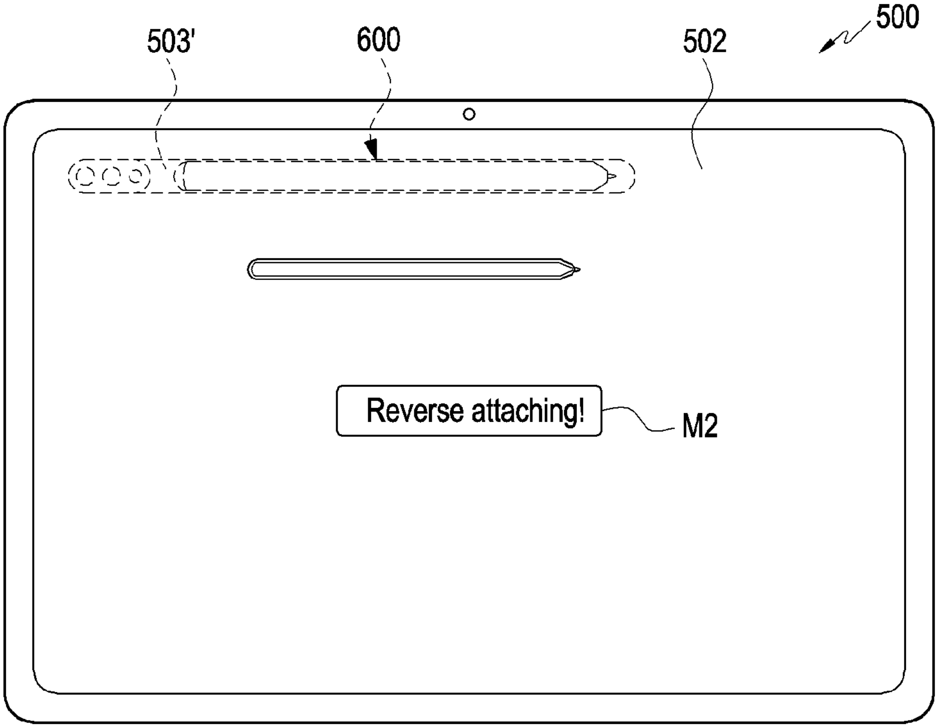
FIG. 21 is a view illustrating an attaching guide message displayed on an electronic device in a reverse attachment state of a pen input device.

FIG. 21 is a view illustrating an attaching guide message displayed on an electronic device 500 in a reverse attachment state of a pen input device 600.

The electronic device 500 may display a charging message through the display 502 corresponding to the reverse attachment state (or tilted attachment state) of the pen input device 600. The electronic device 500 may display, through the display 502, a message indicating that charging is not normally performed corresponding to the reverse attachment state of the pen input device 600 as shown in FIG. 16, for example. According to an embodiment, the display 502 may display an image for the reverse attachment state of the pen input device and display a message indicating that it is needed to adjust the attachment position and/or direction of the pen input device 600 for normal charging, thereby allowing for the user's intuitive recognition.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A. B. or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example. "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments of the disclosure, there may be provided an electronic device, comprising a housing configured to accommodate an electronic component in an inner space, a wireless charging coil disposed on an inner surface of the housing forming the inner space, a first magnetic substance group disposed on the inner surface of the housing and aligned with the wireless charging coil in a first direction, and at least one magnetic field sensor disposed to be spaced apart from the first magnetic substance group by a predetermined distance and aligned with the wireless charging coil and the first magnetic substance group in the first direction, and configured to recognize reverse attachment or tilted attachment of a pen input device attachable to the electronic device.

According to various embodiments, the first magnetic substance group may include a 1-1th magnetic substance aligned with the wireless charging coil in the first direction and a 1-2th magnetic substance aligned with the wireless charging coil and the 1-1th magnetic substance in the first direction.

According to various embodiments, the 1-1th magnetic substance may be longer than the 1-2th magnetic substance.

According to various embodiments, the 1-1th magnetic substance may be formed of a magnet having a plurality of array polarities, and the 1-2th magnetic substance may be formed of a magnet having a single polarity.

According to various embodiments, the 1-1th magnetic substance may be formed of a plurality of magnet sets, and the 1-2th may be formed of a single magnet.

According to various embodiments, the housing may include a metallic material.

According to various embodiments, the housing may include an opening corresponding to the wireless charging coil.

According to various embodiments, the electronic device may further comprise a display exposed through a first plate of the housing, wherein the pen input device is attachable to a second plate facing in a direction opposite to the first plate or a side member surrounding a space between the first plate and the second plate.

According to various embodiments, the housing may include an attaching guide area indicating an attachment position of the pen input device in the second plate or the side member.

According to various embodiments, the attaching guide area may be elongated in the first direction from a camera module included in the second plate.

According to various embodiments, the magnetic field sensor may be positioned in a direction opposite to the wireless charging coil with based on the first magnetic substance group.

According to various embodiments, the magnetic field sensor may be additionally or alternatively disposed at a position between a plurality of magnetic substances included in the first magnetic substance group, with respect to a magnetic field sensor positioned in a direction opposite to the wireless charging coil based on the first magnetic substance group.

According to various embodiments, the magnetic field sensor may be additionally or alternatively disposed at a position adjacent to the wireless charging coil with respect to a magnetic field sensor positioned in a direction opposite to the wireless charging coil based on the first magnetic substance group.

According to various embodiments, the wireless charging coil may be disposed at a position between a plurality of magnetic substances included in the first magnetic substance group.

According to various embodiments, the electronic device may further comprise a processor. The processor may be configured to determine one of a forward attachment state, a reverse attachment state, or a tilted attachment state of the pen input device by using a charging signal of the pen input device received through the wireless charging coil and a magnetic force signal measured through the at least one magnetic field sensor.

According to various embodiments, the processor may be configured to display an attaching guide message for one of a forward attachment state, a reverse attachment state, or a tilted attachment state of the pen input device through a display included in the electronic device.

According to various embodiments of the disclosure, there may be provided an electronic device, comprising a first plate; a second plate facing away from the first plate, a housing including a side member surrounding an inner space between the first plate and the second plate, a wireless charging coil disposed on an inner surface of the housing, a first magnetic substance group disposed on the inner surface of the housing and aligned with the wireless charging coil in a first direction, a magnetic field sensor spaced apart from the first magnetic substance group by a predetermined distance to recognize reverse attachment of a pen input device attachable to the electronic device, and a pen input device attachable to the second plate or the side member, wherein the pen input device includes a second magnetic substance group corresponding to the first magnetic substance group and a coil.

According to various embodiments, the first magnetic substance group of the electronic device may include a 1-1th magnetic substance aligned with the wireless charging coil in the first direction and a 1-2th magnetic substance aligned with the wireless charging coil and the 1-1th magnetic substance in the first direction, and the second magnetic substance group of the pen input device may include a 2-1th magnetic substance aligned with the coil in the first direction and a 2-2th magnetic substance aligned with the 2-1th magnetic substance in the first direction.

According to various embodiments, the 1-1th magnetic substance may be formed to be longer than the 1-2th magnetic substance, and the 2-1th magnetic substance may be formed to be longer than the 2-2th magnetic substance.

According to various embodiments, the 1-1th magnetic substance may be formed of a magnet having a plurality of array polarities, the 1-2th magnetic substance may be formed of a magnet having a single polarity, the 2-1th magnetic substance may be formed of a magnet having a plurality of array polarities, and the 2-2th magnetic substance may be formed of a single polarity.

According to various embodiments, the 1-1th magnetic substance may be formed of a plurality of magnet sets, the 1-2th magnetic substance may be formed of a single magnet, the 2-1th magnetic substance may be formed of a plurality of magnet sets, and the 2-2th magnetic substance may be formed of a single magnet.

According to various embodiments, the second magnetic substance group may include a longer magnetic substance than the first magnetic substance group or form more array polarities than the first magnetic substance group, forming an asymmetric magnetic substance structure.

According to various embodiments, the second magnetic substance group may include a longer magnetic substance than the first magnetic substance group or form more magnetic substance sets than the first magnetic substance group, forming an asymmetric magnetic substance structure.

While the present invention has been shown and described with reference to exemplary embodiments thereof, it will be apparent to those of ordinary skill in the art that various changes in form and detail may be made thereto without departing from the spirit and scope of the present invention as defined by the following claims.

The invention claimed is:

1. An electronic device, comprising:

a housing configured to accommodate an electronic component in an inner space;

a wireless charging coil disposed on an inner surface of the housing forming the inner space;

a first magnetic substance group disposed on the housing and aligned with the wireless charging coil in a first direction; and at least one magnetic field sensor spaced apart from the first magnetic substance group by a predetermined distance and aligned with the wireless charging coil and the first magnetic substance group in the first direction, and configured to recognize reverse attachment or tilted attachment of a pen input device to the electronic device, wherein the first magnetic substance group includes a 1-1th magnetic substance aligned with the wireless charging coil in the first direction and a 1-2th magnetic substance aligned with the wireless charging coil and the 1-1th magnetic substance in the first direction, wherein the 1-1th magnetic substance and the 1-2th magnetic substance are configured to have an asymmetric magnetic structure with respect to each other, wherein the wireless charging coil, the 1-1th magnetic substance and the 1-2th magnetic substance are subsequentially arranged in the first diretion, and when the pen input device is attached in a reverse attachment, a portion of a second magnetic substance group, disposed in the pen input device and corresponding to the 1-1th magnetic substance, is configured to overlap with the at least one magnetic field sensor.

2. The electronic device of claim 1, wherein the 1-1th magnetic substance is formed of a magnet having a plurality of array polarities, and the 1-2th magnetic substance is formed of a magnet having a single polarity.

3. The electronic device of claim 1, wherein the 1-1th magnetic substance is formed of a plurality of magnet sets, and the 1-2th magnetic substance is formed of a single magnet.

4. The electronic device of claim 3, wherein the housing further includes a metallic material, and wherein the housing includes an opening in a position corresponding to the wireless charging coil.

5. The electronic device of claim 1, further comprising a display exposed through a first plate of the housing, wherein the pen input device is attachable to one of a second plate facing in a direction opposite to the first plate and a side member surrounding a space between the first plate and the second plate.

6. The electronic device of claim 5, wherein the housing includes an attaching guide area indicating an attachment position of the pen input device to the second plate or the side member.

7. The electronic device of claim 6, wherein the attaching guide area is elongated in the first direction from a camera module included in the second plate.

8. The electronic device of claim 1, wherein the magnetic field sensor is positioned opposite to the wireless charging coil based on the first magnetic substance group.

9. The electronic device of claim 8, wherein the magnetic field sensor is disposed at a position between a plurality of magnetic substances included in the first magnetic substance group with respect to a magnetic field sensor positioned to the wireless charging coil based on the first magnetic substance group.

10. The electronic device of claim 8, wherein the magnetic field sensor is disposed at a position adjacent to the wireless charging coil with respect to a magnetic field sensor positioned to the wireless charging coil based on the first magnetic substance group.

11. The electronic device of claim 1, wherein the wireless charging coil is disposed at a position between a plurality of magnetic substances included in the first magnetic substance group.

12. The electronic device of claim 1, further comprising a processor, wherein the processor is configured to determine one of a forward attachment state, a reverse attachment state, or a tilted attachment state of the pen input device by using a charging signal of the pen input device received through the wireless charging coil and a magnetic force signal measured through the at least one magnetic field sensor.

13. The electronic device of claim 12, wherein the processor is configured to display an attaching guide message for one of the forward attachment state, the reverse attachment state, and the tilted attachment state of the pen input device through a display included in the electronic device.

14. An electronic device, comprising:

a housing including a first plate, a second plate facing away from the first plate, and a side member surrounding an inner space between the first plate and the second plate;

a wireless charging coil disposed on an inner surface of the housing, a first magnetic substance group disposed on the inner surface of the housing and aligned with the wireless charging coil in a first direction, a magnetic field sensor spaced apart from the first magnetic substance group by a predetermined distance to recognize reverse attachment of a pen input device attachable to the electronic device, and a pen input device attachable to the second plate or the side member, wherein the pen input device includes a second magnetic substance group corresponding to the first magnetic substance group and a coil, wherein the first magnetic substance group of the electronic device include a 1-1th magnetic substance aligned with the wireless charging coil in the first direction and a 1-2th magnetic substance aligned with the wireless charging coil and the 1-1th magnetic substance in the first direction, wherein the wireless charging coil, the 1-1th magnetic substance and the 1-2th magnetic substance are sequentially arranged in the first direction, wherein the second magnetic substance group of the pen input device include a 2-1th magnetic substance aligned with the coil in the first direction and a 2-2th magnetic substance aligned with the 2-1th magnetic substance in the first direction, and wherein the 1-1th magnetic substance is formed to be longer than the 1-2th magnetic substance, and the 2-1th magnetic substance is formed to be longer than the 2-2th magnetic substance.

15. The electronic device of claim 14, wherein the 1-1th magnetic substance is formed of a magnet having a plurality of array polarities, the 1-2th magnetic substance is formed of a magnet having a single polarity, the 2-1th magnetic substance is formed of a magnet having a plurality of array polarities, and the 2-2th magnetic substance is formed of a single polarity.

16. The electronic device of claim 14, wherein the second magnetic substance group include a longer magnetic substance than the first magnetic substance group or form more array polarities than the first magnetic substance group, forming an asymmetric magnetic substance structure.

* * * * *